US010219598B2

(12) United States Patent
Gronewoller et al.

(10) Patent No.: US 10,219,598 B2
(45) Date of Patent: *Mar. 5, 2019

(54) PROTECTIVE CASE FOR AN ELECTRONIC DEVICE WITH A DOCKING RECEPTACLE FOR A WIRELESS PERIPHERAL DEVICE

(71) Applicant: Otter Products, LLC, Fort Collins, CO (US)

(72) Inventors: Peter J. Gronewoller, Fort Collins, CO (US); Edward J. Taylor, Camberwell (AU); Michael P. Denham, Beaumaris (AU)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,963

(22) Filed: Jun. 12, 2018

(65) Prior Publication Data

US 2018/0289123 A1    Oct. 11, 2018

Related U.S. Application Data

(63) Continuation of application No. 15/657,830, filed on Jul. 24, 2017, now Pat. No. 10,028,559, which is a
(Continued)

(51) Int. Cl.
*H04B 1/3888* (2015.01)
*H04B 1/3883* (2015.01)
(Continued)

(52) U.S. Cl.
CPC ............ *A45C 11/00* (2013.01); *H02J 7/0042* (2013.01); *H04B 1/3883* (2013.01);
(Continued)

(58) Field of Classification Search
CPC . H04B 1/385; A45C 2011/003; A45C 13/002; A45C 2013/025; H04M 1/15;
(Continued)

(56) References Cited

U.S. PATENT DOCUMENTS 5,684,883 A    11/1997   Chen
6,763,111 B2   7/2004    Liao
(Continued)

OTHER PUBLICATIONS

Gan, Vicky, "An All-in-One Solution to Tangled Earbud Wires," CityLab, dated Oct. 20, 2015, downloaded from https://www.citylab.com/life/2015/10/an-all-in-one-solution-to-tangled-earbud-wires/411352/ Feb. 28, 2018, 3 pages.
(Continued)

*Primary Examiner* — Nizar N Sivji

(57) ABSTRACT

A protective case for an electronic device and an associated electrical peripheral device includes a structural member for receiving at least a portion of the electronic device and protecting the electronic device when the electronic device is installed in the protective case, an aperture that provides access to a user interface of the installed electronic device, a docking receptacle for removably retaining the electrical peripheral device, and a flexible member attached to the structural member and positioned in proximity to the docking receptacle. The docking receptacle includes a cavity for receiving at least a portion of the electrical peripheral device and an engagement mechanism for removably retaining the electrical peripheral device in the cavity. The flexible member is configured to temporarily deform toward the cavity of the docking receptacle in response to an external force applied to the flexible member.

20 Claims, 17 Drawing Sheets

Related U.S. Application Data continuation of application No. 15/584,144, filed on May 2, 2017, now Pat. No. 9,770,082, which is a continuation of application No. 14/967,561, filed on Dec. 14, 2015, now Pat. No. 9,748,998.

(60) Provisional application No. 62/092,646, filed on Dec. 16, 2014.

(51) Int. Cl.

| | | |
|---|---|---|
| *A45C 11/00* | (2006.01) | |
| *H04M 1/04* | (2006.01) | |
| *H02J 7/00* | (2006.01) | |
| *H04M 1/02* | (2006.01) | |
| *H04M 1/18* | (2006.01) | |
| *H02G 11/02* | (2006.01) | |
| *B65H 75/44* | (2006.01) | |

(52) U.S. Cl.
CPC ........ *H04B 1/3888* (2013.01); *H04M 1/0258* (2013.01); *H04M 1/185* (2013.01); *A45C 2011/001* (2013.01); *B65H 75/4431* (2013.01); *H02G 11/02* (2013.01); *H02J 7/0054* (2013.01); *H04M 1/0262* (2013.01); *H04M 1/04* (2013.01)

(58) Field of Classification Search
CPC .... H04M 1/0258; H04M 1/6058; H04M 1/05; G06F 2200/1632; H04R 5/033; H04R 1/10; H04R 2201/02; H04R 1/1016
See application file for complete search history.

(56) References Cited

U.S. PATENT DOCUMENTS

| | | |
|---|---|---|
| 8,290,547 B2 | 10/2012 | Cataldo et al. |
| 8,365,887 B2 | 2/2013 | Fischer |
| 8,579,172 B2 | 11/2013 | Monaco et al. |
| 8,774,446 B2 | 7/2014 | Merenda |
| 8,800,907 B2 | 8/2014 | Koenig et al. |
| 8,891,800 B1 | 11/2014 | Shaffer |
| 9,071,902 B1 | 6/2015 | Ai |
| 9,148,717 B2 | 9/2015 | Shaffer |
| 9,161,115 B2 | 10/2015 | Schrems et al. |
| 9,602,907 B2 | 3/2017 | Shaffer |
| 2005/0255898 A1 | 11/2005 | Huang |
| 2006/0058081 A1 | 3/2006 | Reichenbach |
| 2012/0077556 A1 | 3/2012 | McKendrick |
| 2012/0145570 A1 | 6/2012 | Monaco et al. |
| 2013/0020425 A1 | 1/2013 | Grassi et al. |
| 2013/0029725 A1 | 1/2013 | Heil-Brice et al. |
| 2013/0129138 A1 | 5/2013 | Washington |
| 2015/0245126 A1* | 8/2015 | Shaffer ................ H04R 1/1025 381/74 |
| 2015/0373448 A1 | 12/2015 | Shaffer |
| 2016/0301444 A1 | 10/2016 | George et al. |
| 2016/0337740 A1 | 11/2016 | Chu et al. |
| 2017/0215293 A1 | 7/2017 | Merenda |

OTHER PUBLICATIONS

Kickstarter, "Skybuds—truly wireless earbuds and smartphone case by Alpha Audiotronics, Inc.—Kickstarter", dated Oct. 13, 2015-Nov. 18, 2015, downloaded from https://www.kickstarter.com/projects/421230074/skybuds-truly-wireless-earbuds-and-smartphone-case Mar. 1, 2018, 32 pages.

Tan, Alicia Marie, "Say farewell to tangled headphones with these wireless earbuds," Mashable, dated Oct. 14, 2015, downloaded from https://mashable.com/2015/10/14/skybuds-kickstarter/#IJ4IHoMO2aqO on Feb. 28, 2018, 21 pages.

\* cited by examiner

PROTECTIVE CASE FOR AN ELECTRONIC DEVICE WITH A DOCKING RECEPTACLE FOR A WIRELESS PERIPHERAL DEVICE

CROSS REFERENCE TO RELATED APPLICATIONS

This application is a continuation of U.S. patent application Ser. No. 15/657,830, which claims priority to U.S. patent application Ser. No. 15/584,144 filed on May. 2, 2017, now U.S. Pat. No. 9,770,082, which claims priority to U.S. patent application Ser. No. 14/967,561, filed on Dec. 14, 2015, now U.S. Pat. No. 9,748,998, which claims priority to U.S. Provisional Patent Application 62/092,646, filed on Dec. 16, 2014, the contents of which are hereby incorporated by reference in their entireties.

FIELD

The present application relates to protective cases for electronic devices. More specifically, the present application relates to protective cases for electronic devices that provide features for use with audio devices that are used with the electronic devices.

BACKGROUND

Portable electronic devices are commonly used for communication and entertainment purposes. Portable electronic devices include devices such as smartphones, cellular phones, mobile communication devices, portable computers, tablet computers, cameras, video players, audio players, electronic media readers, two-way radios, global positioning satellite (GPS) devices, and/or other types of electronic computing or communication devices, including combinations thereof. Protective cases, covers, enclosures, or encasements are sometimes used with these types of electronic devices in order to protect the devices from damage due to exposure to shock, impact, dropping, puncture, dust, dirt, water, snow, rain, mud, chemicals, and/or other potentially damaging forces or elements.

The types of portable electronic devices and mobile computing devices described above are also sometimes used with peripheral devices. Peripheral devices may include headphones, audio headphones, earbuds, ear buds, headsets, external speakers, external microphones, and/or other types of peripheral devices that are external to the portable electronic device. Portable electronic devices are also sometimes used with various types of sensors such as a biological sensor, an exercise-related sensor, a medical monitoring sensor, an environmental sensor, and/or an industrial sensor. Although the improvements disclosed herein are primarily described with respect to earbuds and audio headphones, the improvements are equally applicable to any type of peripheral device that may be used with the portable electronic device, including, but not limited to, the other examples of peripheral devices provided herein.

The peripheral devices with which the improvements described herein may be used or applied may include wired peripheral devices, wireless peripheral devices, or peripheral devices having both wired and wireless features. The techniques disclosed herein provide improved methods of performing various functions associated with the peripherals including improved methods of: storing the peripheral devices in a protective case with the portable electronic device, carrying the peripheral devices with the portable electronic device, managing cords or cables associated with the peripheral device, using the peripheral device, receiving data from the peripheral device, transmitting data to the peripheral device, charging the peripheral device, and/or providing power to the peripheral device.

In the example of headphones, users of portable electronic devices often carry headphones, headsets, or earbuds with them to be used with the portable electronic device. Receiving audio signals or data from the electronic device through a headphone rather than through a built in speaker of the electronic device may provide a number of benefits including: permitting the user to better hear audio information in a noisy environment, permitting the user to hear audio information without disturbing others in the area, permitting the user to hear the audio information confidentially, permitting the user to get the audio information in a higher quality form or in a more amplified form. Often, plugging a headphone, headset, or external speaker into an audio jack of the portable electronic device disables one or more speakers built into the electronic device, or otherwise causes audio information to not be output through the one or more built in speakers of the electronic device.

Remote microphones may also be used with electronic devices in manners similar to those described above with respect to headphones. In other words, a user may use one or more external or auxiliary microphones with a portable electronic device rather than using a built in microphone of the portable electronic device, either temporarily or permanently. In some situations, an external microphone may also be included on or with a headphone. This allows a user to conduct a voice call and also get some or all of the headphone benefits described above with respect to the microphone. It may also allow a user to speak on a call without having to speak into or close to the built in microphone of the electronic device. In some situations, the microphone is configured in a position relative to the headphone such that the microphone will be relatively close to the user's mouth when the headphone is in or near the user's ear.

Existing peripheral solutions have a number of shortcomings. In the case of wired peripherals, managing and storing cords and cables is often an issue as they often become tangled within themselves and/or tangled with other cords, cables, or devices. Also, it is often easy for a user to forget to take the peripheral when heading out and/or to find the peripheral among other items in a backpack, purse, briefcase, suitcase, or drawer when it is needed. Often there is a time sensitivity associated with finding, untangling, and/or getting the peripheral attached to the electronic in order to answer or participate in a phone call.

Challenges also exist in the case of wireless peripherals, such as wireless earbuds and headphones that are used with portable electronic devices. Although wireless peripherals do not typically have the cord management issues discussed above, they may have other issues associated with storage, potentially being misplaced, potentially being forgotten, and/or needing to periodically be recharged.

SUMMARY

Protective cases for electronic devices are disclosed herein. The disclosed protective cases may include and/or may be used with peripheral devices, may include storage locations for peripheral devices, and/or may include management features associated with the peripheral devices.

In one example, a protective case is provided. The protective case is used with a portable electronic device, such as a smartphone, and with wireless earbuds configured for wirelessly exchanging data with the portable electronic device. The protective case includes a shell configured for receiving at least a portion of the portable electronic device and protecting the portable electronic device when the portable electronic device is received and installed in the shell. The protective case may also include an aperture in the shell configured to provide access to a user interface, such as a touchscreen, of the installed portable electronic device. The protective case may also include an internal electrical connector configured to electrically interface with the installed portable electronic device. The protective case may also include a rechargeable battery contained in the shell and configured for recharging a battery of the installed portable electronic device through the internal electrical connector. The protective case may also include two docking receptacles configured for removably docking the wireless earbuds in the shell when the wireless earbuds are not in use, each docking receptacle including a cavity for receiving at least a portion of a respective one of the wireless earbuds when docked in the docking receptacle. Each docking receptacle may further include an electrical interface for electrically interfacing the rechargeable battery of the protective case to the respective one of the docked wireless earbuds for recharging the docked wireless earbuds from the rechargeable battery of the protective case. Further, the protective case may include an external electrical connector configured for receiving electrical power from an external power source for recharging the rechargeable battery of the protective case.

In another example, a protective case for an electronic device and an associated electrical peripheral device is provided. The protective case includes a rigid member for receiving at least a portion of the electronic device and protecting the electronic device when the electronic device is installed in the protective case. The protective case also includes an aperture that provides access to a user interface of the installed electronic device and a docking receptacle for removably retaining the electrical peripheral device. The docking receptacle includes a cavity for receiving at least a portion of the electrical peripheral device and an engagement mechanism for removably retaining the electrical peripheral device in the cavity. Finally, the protective case includes a flexible member attached to the rigid member and positioned in proximity to the docking receptacle. The flexible member is configured to temporarily deform toward the cavity of the docking receptacle in response to an external force applied to the flexible member such that the flexible member contacts the retained electrical peripheral device and ejects the electrical peripheral device from the docking receptacle.

In another example, a protective case for an electronic device and associated wireless electrical peripheral device is provided. The protective case includes a protective shell for protecting the electronic device when the electronic device is inserted in the protective shell; a docking receptacle including a cavity for receiving at least a portion of the associated electrical peripheral device and an engagement mechanism for removably retaining the received portion of the associated electrical peripheral device in the cavity; and a battery for charging at least one of the inserted electronic device and the retained wireless electrical peripheral device.

In another example, a protective case for an electronic device and associated first and second earbuds is provided. The protective case includes a protective shell for protecting the electronic device when the electronic device is inserted in the protective shell; a first docking location for receiving and removably retaining at least a portion of the first earbud; a second docking location spaced apart from the first docking location for receiving and removably retaining at least a portion of the second earbud; and a battery for charging the retained first and second earbuds.

In another example, a protective case for an electronic device and an associated electrical peripheral device. The protective case includes a structural member for receiving at least a portion of the electronic device and protecting the electronic device when the electronic device is installed in the protective case; an aperture that provides access to a user interface of the installed electronic device; a docking receptacle for removably retaining the electrical peripheral device, wherein the docking receptacle includes a cavity for receiving at least a portion of the electrical peripheral device and an engagement mechanism for removably retaining the electrical peripheral device in the cavity; and a flexible member attached to the structural member and positioned in proximity to the docking receptacle, wherein the flexible member is configured to temporarily deform toward the cavity of the docking receptacle in response to an external force applied to the flexible member, the deformation of the flexible member resulting in the flexible member contacting the retained electrical peripheral device to eject the electrical peripheral device from the docking receptacle.

In another example, a protective case for use with a portable electronic device and a first wireless earbud configured for wirelessly exchanging data with the portable electronic device is provided. The protective case includes a structural member for receiving at least a portion of the electronic device and protecting the electronic device when the electronic device is installed in the protective case; an aperture configured to provide access to a user interface of the installed electronic device; a first receptacle including a first engagement mechanism for removably retaining the first wireless earbud and a first cavity for receiving at least a portion of the first wireless earbud when the first wireless earbud is retained in the first receptacle; and a first flexible member attached to the structural member and positioned in proximity to the first receptacle. The first flexible member includes a first section configured to deform toward the first cavity in response to an external force applied to the first flexible member, the deformation of the first section resulting in the first flexible member ejecting the first wireless earbud from the first cavity.

In another example, a protective case for an electronic device and an associated wireless electrical peripheral device is provided. The protective case includes a structural member for receiving at least a portion of the electronic device and protecting the electronic device when the electronic device is installed in the protective case. The protective case also includes an aperture that provides access to a user interface of the installed electronic device. The protective case also includes a docking receptacle for removably retaining the wireless electrical peripheral device, wherein the docking receptacle includes a cavity for receiving at least a portion of the wireless electrical peripheral device and an engagement mechanism for removably retaining the wireless electrical peripheral device in the cavity. The protective case also includes a flexible member attached to the structural member and positioned in proximity to the docking receptacle, the flexible member including one or more folds adapted to allow the flexible member to temporarily deform toward the cavity of the docking receptacle in response to an external force applied to the flexible member, the deformation of the flexible member resulting in the flexible member ejecting the retained wireless electrical peripheral device from the cavity, the one or more folds adapted to return the flexible member to its default position.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

Figure 1:
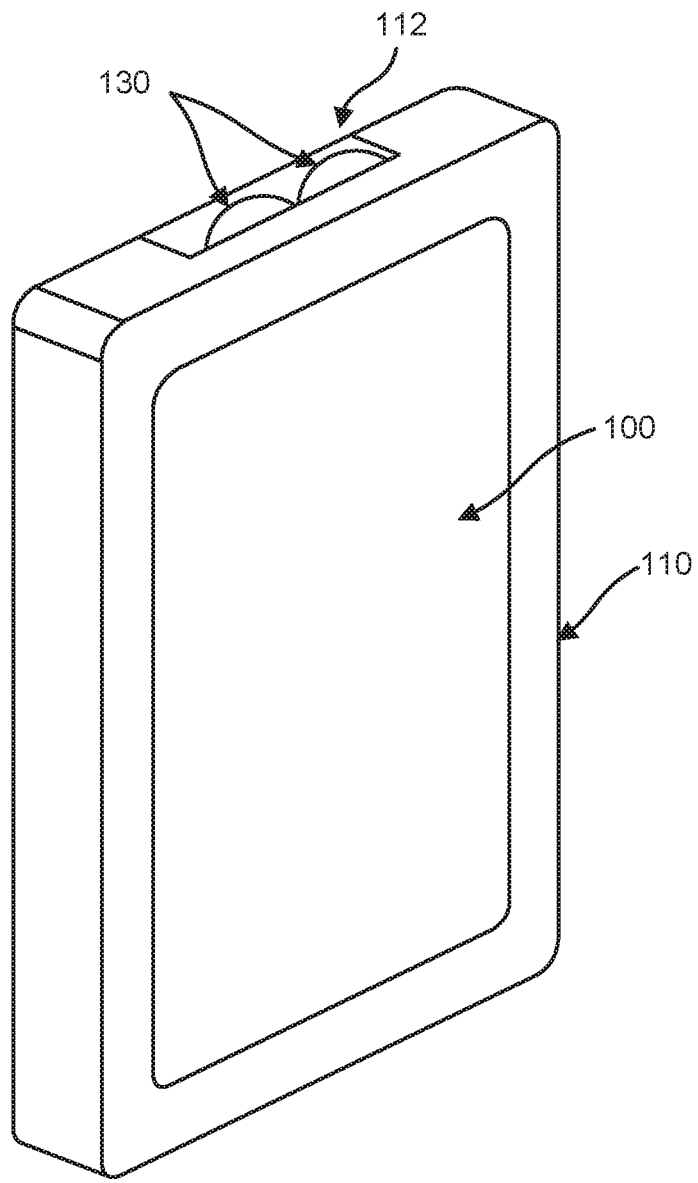
FIG. 1 illustrates a protective case for an electronic device.

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

In one example, a protective case for an electronic device and an associated electrical peripheral device is provided. The protective case includes a rigid member and/or a structural member for receiving at least a portion of the electronic device and protecting the electronic device when the electronic device is installed in the protective case. The protective case may also include an aperture that provides access to a user interface of the installed electronic device and a docking receptacle for removably retaining the electrical peripheral device. The docking receptacle may include a cavity for receiving at least a portion of the electrical peripheral device and an engagement mechanism for removably retaining the electrical peripheral device in the cavity. Finally, the protective case may include a flexible member attached to the rigid member and positioned in proximity to the docking receptacle. The flexible member is configured to temporarily deform toward the cavity of the docking receptacle in response to an external force applied to the flexible member such that the flexible member contacts the retained electrical peripheral device and ejects the electrical peripheral device from the docking receptacle. In some configurations, the protective case may also include features for providing electrical power to and/or charging the electrical peripheral device.

In another embodiment, a protective case for an electronic device provides protection to the electronic device and also provides a retractable, corded peripheral for use with the electronic device. The peripheral may include one or more headphones, a microphone, a biological sensor, a biometric sensor, an industrial sensor, or any other type of electrical input or output device that interfaces with the electronic device through an electrical cord or cable. The protective case may include a spool or roll for rolling up the peripheral cable when the peripheral is not in use in order to reduce the chance of tangling of the cord and/or misplacement of the peripheral. The spool may be spring loaded such that it automatically rolls up the cable(s) of the peripheral when activated. The spool may also be manually operated by a user to roll up the cable(s). For example, the back of the protective cover may contain a rotatable disk with a depression for a user's finger such that the user rotates the disk using the depression to roll up the cable(s). When rolled up or retracted, the cable may or may not be visible from the outside of the case.

The protective case may have one or more recesses, cut-outs, cavities, reliefs, slots, compartments, and/or other types of storage locations for a peripheral, or for a portion of a peripheral. This allows the peripheral to be held on or within the protective case in a manner that provides it protection, allows the user to easily slide the protective case in and out of a storage location such as a pocket or backpack without snagging or damaging the peripheral, and reduces stress and strain on the cables, if any, by reducing or eliminating potential movement of the peripheral relative to the cable(s) when not in use.

The cable management mechanisms described herein may also be configured to allow a corded peripheral to be extended from a case partially. For example, a protective case with retractable headphones may include six feet of cable for the headphones even though that length of headphone cable may only be needed in some circumstances.

Therefore, a user may only extend 2 or 3 feet of the cable for some uses. This allows the user to have more peripheral cable length available when needed, but not have the full length of cable in the way or exposed to potentially get tangled when it is not needed.

FIG. 1 illustrates a protective case 110 for an electronic device 100. Electronic device 100 may be a smartphone, cellular phone, mobile communication device, portable computer, tablet computer, camera, video player, audio player, electronic media reader, two-way radio, global positioning satellite (GPS) device, and/or other types of electronic computing or communication device, including combinations thereof. Protective case 110 includes any case, cover, and/or encasement that at least partially covers electronic device 100 and protects electronic device 100 when it is installed in protective case 110. Protective case 110 may include multiple components, may include rigid components, and may include soft components. Protective case 110 may include a membrane, transparent membrane, or thin film through which a touchscreen or other interface features of electronic device 100 are operated while electronic device 100 is inside protective case 110. Any of the components of protective case 110 may be made of any material or combination of materials including plastic, silicone, elastomer, metal, glass, ceramic, wood, and/or combinations thereof.

The protective cases disclosed herein may include any type of case, protective case, cover, protective cover, encasement, protective encasement, shell, protective shell, crush resistant case, crush proof case, water proof case, water resistant case, and/or combinations thereof. The protective cases may comprise one, two, three, or more shell portions designed to encase the electronic device, partially or completely. The various shell portions may have one or more clasping mechanism for attaching to each other and for retaining the electronic device. One or more of the shell portions may have a front portion, a back portion, side portions, a proximal portion, a distal portion, an inner surface, an outer surface, an aperture, a button feature, a switch feature, a door, an access port, and/or an opening for accessing one or more features of the electronic device.

Protective case 110 includes a storage area, such as recess 112, for headphones 130 (only partially visible in FIG. 1) which may be used with electronic device 100. Headphones 130 may be stored in recess 112 of protective case 110. Recess 112 may contain headphones 130 either partially or completely. Beneficially, storage of headphones 130 in recess 112 allows the outside envelope of protective case 110 to remain relatively smooth such that it can be put in a pocket or bag without significant increased risk of snagging or catching on headphones 130, or cables or other features associated with headphones 130. In addition, headphones 130 are held in place such that stresses and strains, if any, on the connections between the cable(s) (not visible in FIG. 1) and the headphones are reduced or eliminated.

While many of the examples herein are discussed with respect to headphones and earbuds, the techniques disclosed herein are similarly applicable to other types of electrical and/or electronic peripheral devices that may be used with an electronic device, such as electronic device 100, including wired and wireless peripheral devices.

Figure 2:
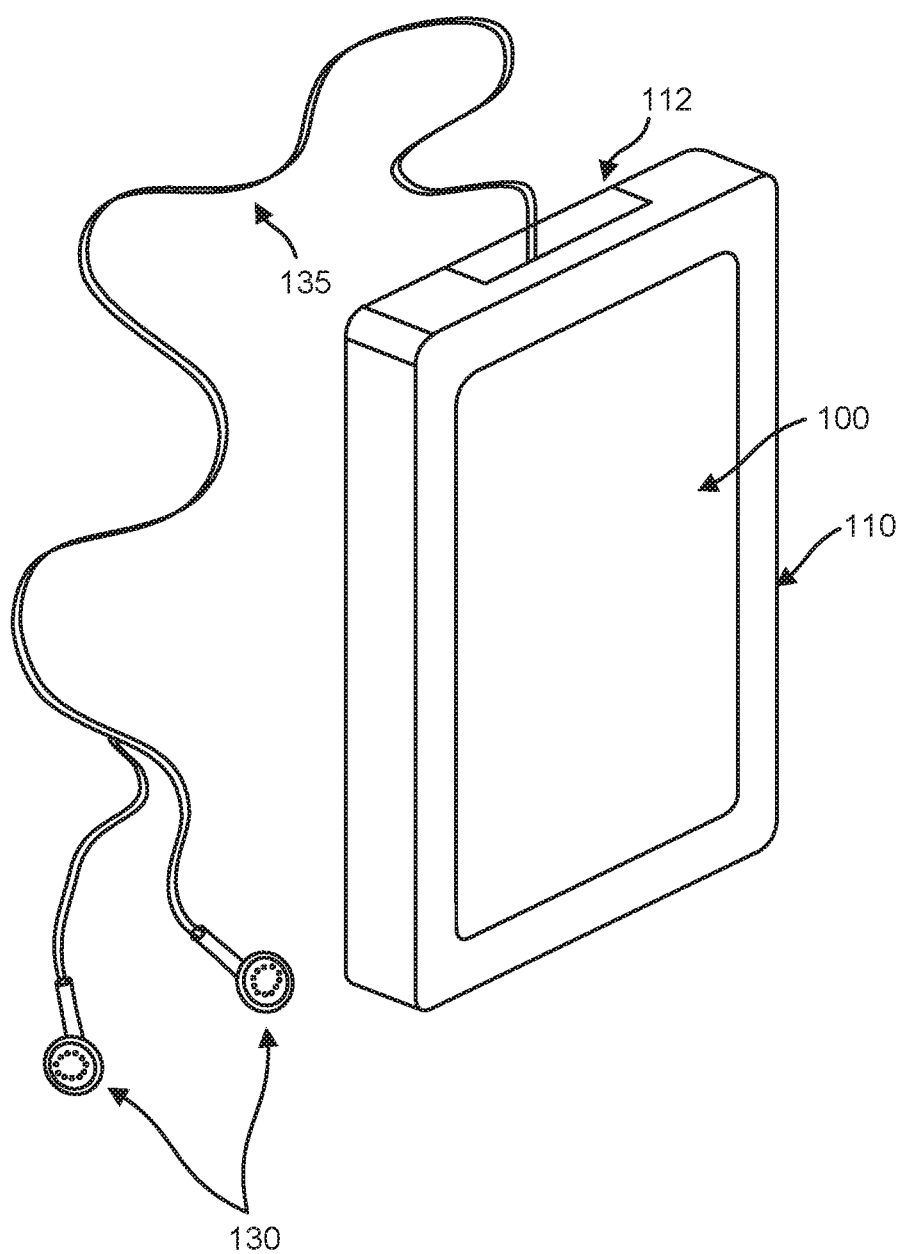
FIG. 2 illustrates a protective case with a peripheral device.

FIG. 2 illustrates protective case 110 with headphones 130 of FIG. 1 in an extended, or partially extended, configuration. A user may extend headphones 130, as illustrated, to use them to listen to audio information produced by electronic device 100, such as to listen to music played by a software application running on electronic device 100. Headphones 130 are attached to electronic device 100 through cable 135. An additional length of cable 135 may be inside protective case 110. The additional length of cable 135 to be extended further, if and when necessary. Cable 135 may include an electromechanical plug, such as an audio plug or headphone plug, for connecting headphones 130 to electronic device 100. The electrical connection may be accomplished in a variety of manners. In one configuration, cable 135 may include an electrical connector that attaches directly to an electrical interface, connector, plug, port, or jack of electronic device 100. Alternately, cable 135 may electrically connect, permanently or semi-permanently, to protective case 110 and protective case 110 may indirectly provide the electrical connection between headphones 120 and electronic device 100. In one example, protective case 110 may include an audio plug that is inserted into an audio jack of electronic device 100 when electronic device 100 is inserted into protective case 110. The audio jack of protective case 110 may be electrically connected, permanently or semi-permanently, to cable 135 and headphone 130 for providing electrical signals from electronic device 100 to headphones 130.

An electrical connector or plug that is internal to protective case 110 may also be attached to a short flexible cable that a user manually manipulates and attaches to electronic device 100 as or before electronic device 100 is inserted into protective case 110. Alternately, the electrical connector or plug of protective case 110 may be rigidly attached to protective case 110 and positioned such that it becomes inserted into electronic device 100 when electronic device 100 is inserted into protective case 110 without any specific further manipulation or interaction from the user, other than the insertion of electronic device 100 into protective case 110.

Recess 112 may include one or more compartments, sections, cavities, recesses, and/or cutouts for each of headphones 130 and/or for any other feature(s) of another type of peripheral device. Protective case 110 and/or headphones 130 may include retention features that allow headphones 130 to snap into recess 112 or otherwise be removably held or retained in recess 112 in a fixed or secure configuration. The retention features may include a snap, a tab, a clip, a spring clip, a magnet, a flexible element, a twist lock feature, a threaded portion, a friction fit, an interference fit, a piece of compliant material, or another component which provides some type of attachment, friction, stiction, and/or adhesion which causes headphone 130, or another peripheral, to tend to stay in place in protective case 110 while still being removable by a user. While recess 112 is illustrated as being on a top back portion of protective case 110, recess 112, or a plurality of recesses, may be included on any part of protective case 110.

Figure 3:
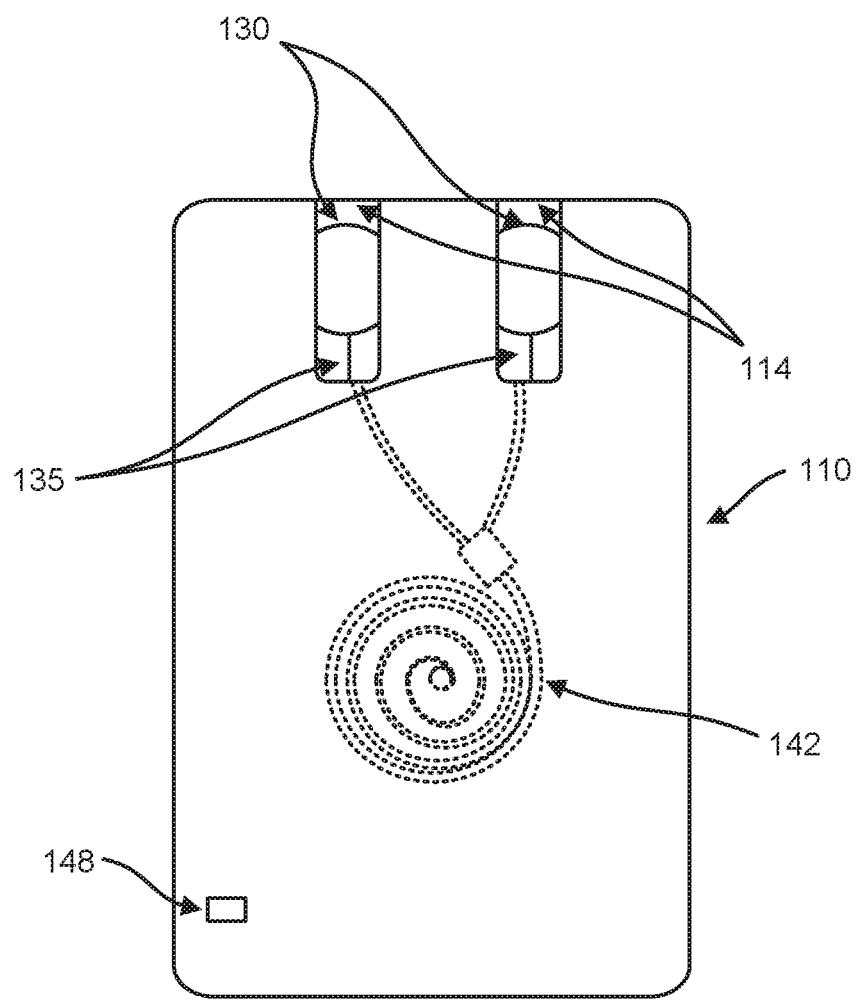
FIG. 3 illustrates a protective case with a stowed peripheral device.

FIG. 3 illustrates a back view of a protective case 110 with headphones 130 stowed. An electronic device in protective case 110 may be visible from the opposite side of protective case 110 through an aperture in protective case 110. Headphones 130 are stowed in slots 114 in protective case 110 and cable 135 is wound up inside protective case 110 on spool 142 for ease of storage, ease of transport, and to avoid tangling. Cable 135 is also electrically connected to an electronic device inside protective case 110 (not visible in FIG. 3), either directly or indirectly. Spool 142 may be spring loaded or otherwise configured to apply force to roll up or retract cable 135. Protective case 110 may also include a switch, actuator, or trigger, such as switch 148, for actuating the spring loaded function of spool 142 described above. In one example, a user may pull headphones 130 out of protective case 110 for use. Cable 135 unwinds off of spool 142. A ratcheting function may be included to enable cable 135 to remain extended once the user quits pulling, even though spool 142 is spring loaded. When use is complete, switch 148 may release the ratcheting function so that spool 142 automatically rolls cable 135 back into the protective case for stowage or transport. Other mechanisms for rolling, winding, or storing cable 135 inside protective case 110 are possible and the techniques disclosed herein are not to be limited to the exemplary implementations. As used herein, the terms electrically connected and electrically interfaced may mean directly electrically connected or may mean indirectly electrically connected through other electrical components and/or electrical conductors.

Figure 4:
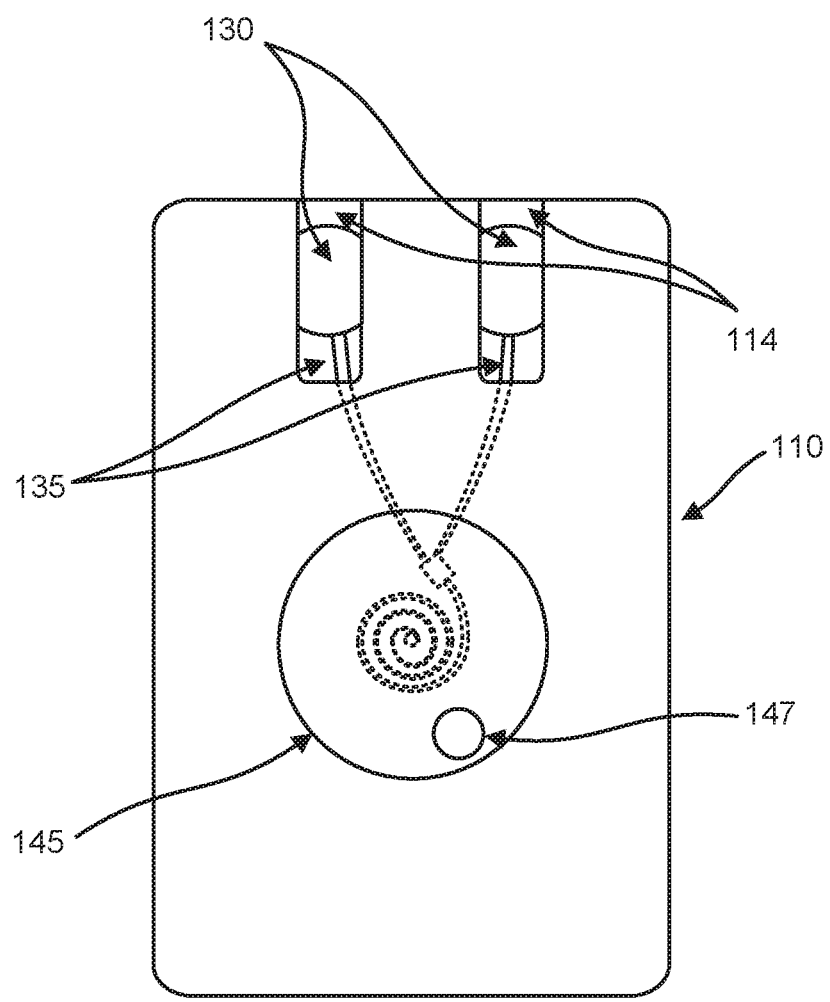
FIG. 4 illustrates a protective case with a stowed peripheral device.

FIG. 4 illustrates protective case 110 with headphones 130 stowed in an alternate implementation of the example of FIG. 3. In FIG. 4, rotatable disk 145 is attached to the back of protective case 110 and is movable with respect to protective case 110. Rotatable disk 145 includes depression 147 which enables a user to easily use a fingertip, or other object, to rotate rotatable disk 145. Rotatable disk 145 rotates a shaft or spool inside protective case 110 to roll up cables 135 as describe with respect to FIG. 3. Rotatable disk 145 may also be implemented in conjunction with the spring loaded solution described with respect to FIG. 3. While the examples of FIGS. 3 and 4 illustrate cable 135 being primarily stored inside protective case 110, other configurations may be implemented such that cable 135 is fully or partially exposed on an outer surface of protective case 110. In another variation, headphones 130 may extend from different sides and/or ends of protective case 110 in order to make it easier for a user to keep track of which headphone or earbud is for the left ear and which is for the right ear.

As described above, retractable headphones and/or other electrical peripherals may be permanently or semi-permanently attached to an electronic device when used with a protective case of the type described herein. When a phone or other electronic device is inserted into the case, an electrical connection may be made to a headphone jack or to some other electro-mechanical interface, such as to a USB connector or to an APPLE Lightning connector, for connecting a peripheral device to the electronic device. Because this electrical connection may be intact for the entire period the electronic device is in the case, the electronic device may always detect that the peripheral device is attached when the electronic device is in the case.

In one specific example, a phone in a protective case that includes retractable headphones may always detect that the headphones are connected even though the headphones are retracted and not actually in use. Many phones use physical and/or electrical detection of headphone plug insertion to determine whether audio should be routed to/from the speaker/microphone on the body of the phone in amplified form or to/from the headphone jack for use through the headphones.

Therefore, whenever an electronic device is in the protective case, the electronic device may detect a connection and route audio to/from the headphones. This may be true even if the headphones are retracted and the user is not intending to use the headphones in the current session. A protective case that automatically connects to a headphone jack of an electronic device may have certain conveniences, but may require the user to always use the electronic device with the headphones when the electronic device is in the protective case because the headphone electrical connection to the electronic device is always in place when the electronic device is in the case. If the user wishes to use the electronic device with the conventional, internal, integral speaker and/or microphone, the electronic device may have to be taken out of the protective case to cause the electronic device to revert to its default mode with respect to the speaker and/or microphone. Alternately, a user may interact with the electronic device to change a setting to cause the electronic device to use the integral speaker or microphone even though the headphones are plugged into the electronic device inside the protective case. However, both of these solutions may be inconvenient for users and/or may require manual intervention.

In one embodiment, the protective case senses whether the headphones are retracted or extended and communicates this information to the electronic device. The electronic device then uses this information to determine routing of audio when the user places a call, receives a call, receives a message, plays music, plays a video, etc. Whether or not the headphones have been physically extended by the user can be detected in many ways including using a mechanical switch, a proximity sensor, an optical switch, an optical sensor, and/or a magnetic device to detect when magnets in the earphones are near the protective case. Alternately or in addition, a position sensor may be used to detect a position of a device that is used to roll up the headphone cord inside the protective case. In another variation, an inductive sensor and/or measurement may be used to determine whether or how much of the headphone cable is rolled up or on the spool versus much is unrolled into a linear, or near linear, state. Other methods of detecting headphone extension are possible.

After detecting whether the headphones are extended, this information is communicated to the electronic device. The protective case may be capable of communicating with the electronic device or providing information to the electronic device in some other way. Communication from the protective case to the electronic device may occur through a wired connection to the electronic device or through a wireless connection, such as a wireless connection using Bluetooth, Bluetooth Low Energy (BLE), or Near Field Communication (NFC). If a call is received and the headphones are retracted into the case, the electronic device may use this information to determine a need to use the internal or embedded electronic device speaker/microphone of the electronic device even though a plug is physically plugged into the headphone jack inside the protective case. The existing electronic device firmware may be capable of receiving and using this information in the manner described above or it may be necessary to run a supplemental software application, or an "app," on the electronic device to facilitate this capability. Beneficially, it would not be necessary for the user to manually interact with the app for each use as the determination of whether the headphones were extended or retracted would automatically be detected and communicated to the electronic device based on the physical position of the headphones relative to the protective case, using one or more of the techniques described herein.

In some configurations, the electronic device may also dynamically change the speaker/microphone settings during a use session. For example, if an electronic device is in a retractable headphone case in a backpack and a call or notification arrives, the user may struggle to find the electronic device and may answer it at the last second before a caller hangs up or the call goes to voicemail. The user may wish to use the headphones but may not be able extend them and/or get them in place quickly enough before answering the call. Because the headphones are retracted, the electronic device uses the built in speaker/microphone even though it is attached to the headphone case in accordance with the techniques described herein. Once the user begins the discussion, he/she can later extend the headphones and continue the call with the headphones, which may also include a microphone. Beneficially, the protective case will automatically detect when the headphones are extended and communicate this information or make it available to the electronic device. Based on this information, the electronic device may switch the audio from the built in speaker/microphone to the now extended headphone/microphone.

The protective cases disclosed herein may also include an electromechanical switch that the user toggles to indicate whether the attached headphones should be used. However, communication between the protective case and the associated electronic device may still be necessary to transmit the state of the switch to the electronic device. Without some type of communication between the protective case and the electronic device, the electronic device may otherwise detect that a jack is plugged into the headphone port (the jack being part of the case) and route the audio to/from the headphones through the case rather than using the internal or integral speaker/microphone.

Figure 5:
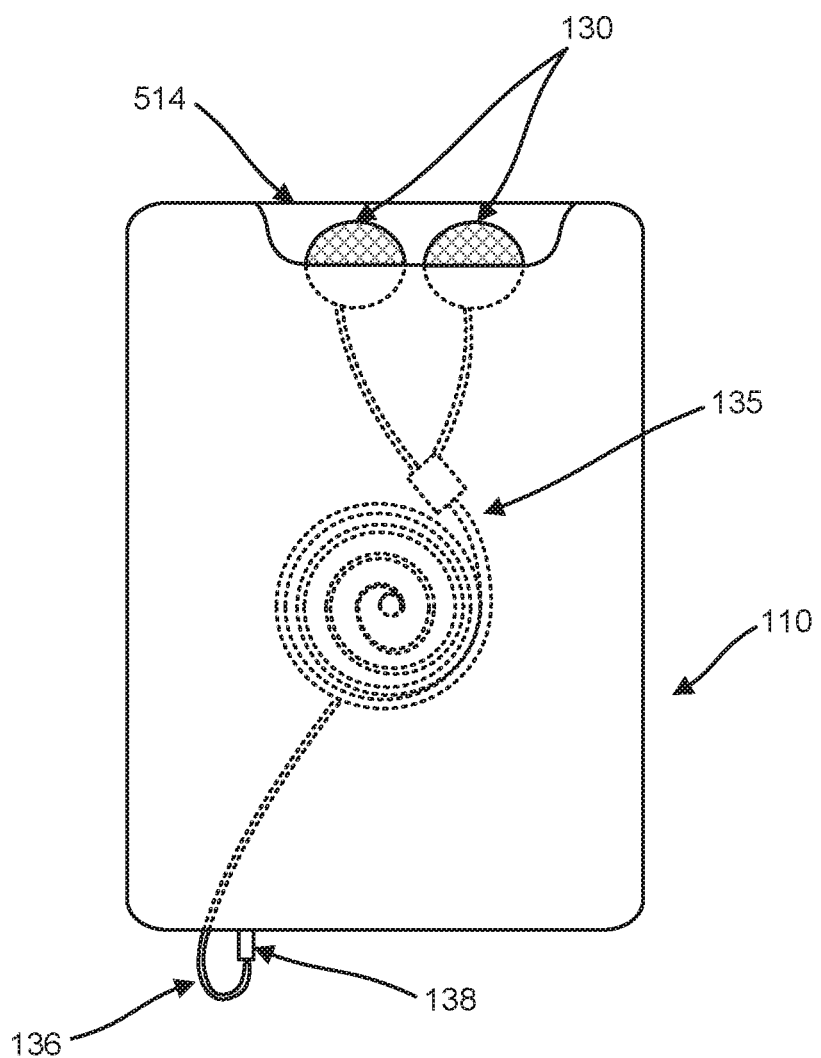
FIG. 5 illustrates an alternate configuration of a protective case with a stowed peripheral device.

FIG. 5 illustrates an alternate implementation of a protective case 110. In the example of FIG. 5, headphones 130 are stored in a pocket 514 in protective case 110 with the cable 135 to the headphones stored inside the case and rolled up on a spool similar to previous examples. Pocket 514 is an example of recess 112 and/or slots 114. However, in this example cable 135 does not interconnect to electronic device 100 inside protective case 110. Instead cable 135 leads to an external cable portion 136 which plugs into electronic device 100 using a jack 138 that extends through an aperture or opening in a wall of protective case 110 and plugs into electronic device 100 which is inside protective case 110 (and not visible in FIG. 5). While the embodiment of FIG. 5 may not result in a protective case with an outer envelope that is as smooth as other examples when the headphones are plugged in, this embodiment may be simpler in that no electrical connection between protective case 110 and electronic device 100 may be needed and/or it may not necessary to make an electrical connection inside protective case 110. In this way, the user can manually plug or unplug headphones 130 without taking electronic device 100 out of protective case 110.

The techniques and improvements described herein are not to be limited to any particular type of protective case and may be used with many different types of protective cases. Protective cases using one or more of the techniques disclosed herein may or may not be water-resistant or waterproof. The protective cases may have various rigid and/or compliant components for protecting the electronic device from shock, impact, vibration, dirt, rain, snow, dust, puncture, extreme acceleration, and/or other potentially damaging forces or elements. The pocket, recess, opening, compartment, slot, cavity, or other space in which headphones or another peripheral are stored in the case can vary in number, shape, size, and/or location on the case.

Electronic devices are commonly powered by one or more internal batteries or other electrical power sources. The battery(s) enable electronic devices to be used in a portable manner and/or without being tethered to a power source. These batteries are often rechargeable. Electronic devices with more features, such as larger displays and more computing power, typically consume the available battery power more quickly. When an electronic device's battery is exhausted, the device may become unusable until the battery can be recharged or until the device can be connected to another battery or a power source, such as a wall outlet. Battery capacity may become an issue due to factors such as power requirements of the electronic device, extended usage of the electronic device, physical space constraints of the internal battery, power requirements of peripheral(s) attached to the electronic device, temperature extremes, unavailability of a power source for charging, decreased battery capacity due to aging of the battery, decreased battery life due to the number of charge/discharge cycles the battery has endured, or combinations thereof. These factors can reduce the usefulness of the electronic device because usage of the device between recharges is limited and the user may have to discontinue use due to a depleted battery until a power source is located.

Some existing protective cases for electronic devices include supplemental power devices or power sources for supplying power from the case to the electronic device. Supplemental power is often provided by one or more rechargeable batteries included in the protective case. The rechargeable batteries of the protective case may be used to power the inserted electronic device and/or to charge the internal battery of the electronic device. While many of the examples herein are discussed in the context of a single supplemental battery or power source, it should be understood that the techniques, apparatuses, and methods disclosed herein are also applicable to configurations in which more than one power source in the electronic device is used and/or more than one supplemental power source in the case is used. Protective cases having batteries as supplemental power sources are sometimes generally referred to as "battery cases." However, the techniques disclosed herein are equally applicable to protective cases having other types of power sources including: a solar cell, a fuel cell, a kinetic energy capture mechanism, a supercapacitor, a thermal cell, an external power source, and/or combinations thereof.

Figure 6:
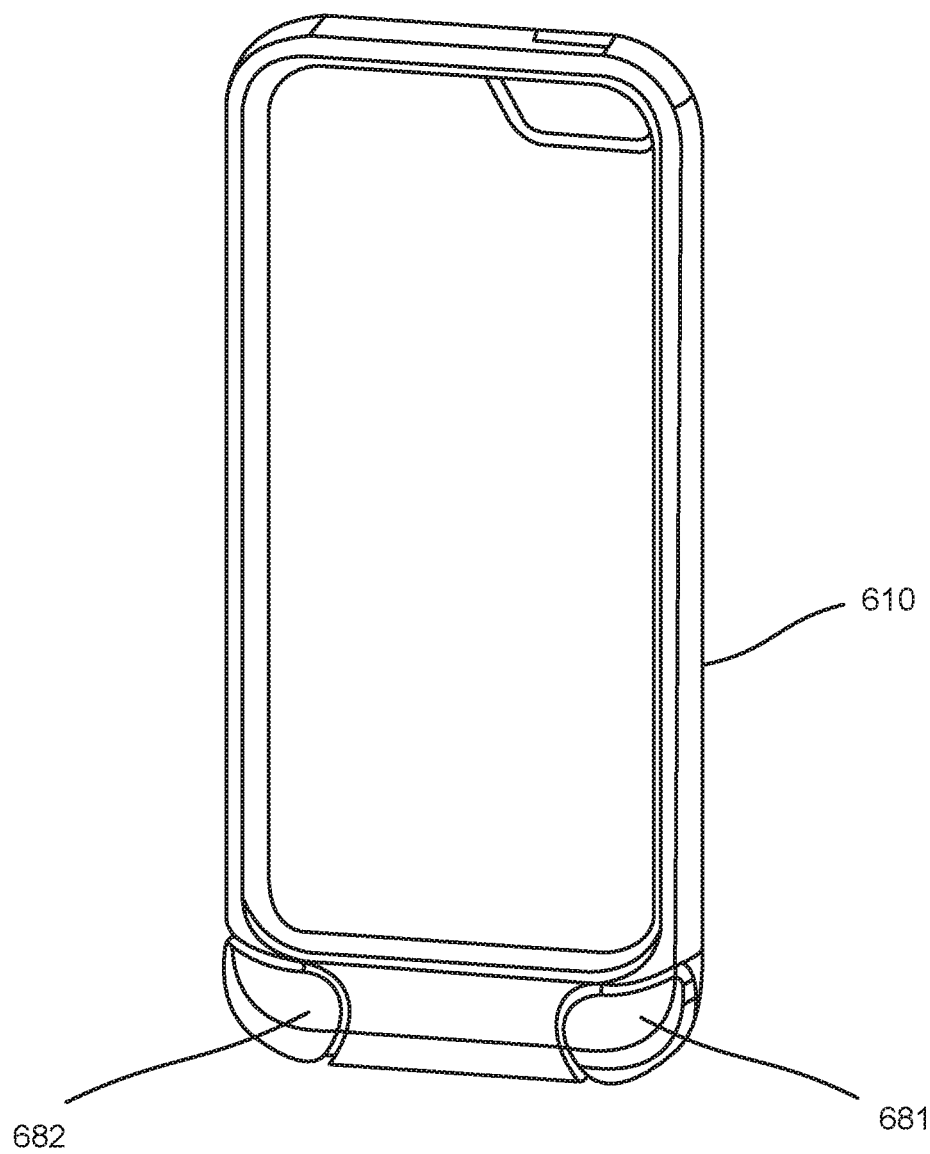
FIG. 6 illustrates a protective case with stowed wireless peripheral devices.

FIG. 6 illustrates a battery case 610 for an electronic device. The electronic device (not illustrated in FIG. 6) fits into battery case 610 and can receive electrical power from a battery in battery case 610. Battery case 610 also includes storage or docking locations for earbuds 681 and 682. Earbuds 681 and 682 are wireless earphone devices a user may place in or near his or her ear for listening to audio information wirelessly transmitted by an electronic device. Earbuds 681 and 682 may be any kind of earphone, headphone, speaker, and/or other type of listening device. In one specific example, a smartphone inserted into battery case 610 wirelessly transmits audio playback data using Bluetooth Low Energy to earbuds 681 and 682, which have been inserted into the user's ears. In this way, the user is able to listen to the audio playback data without bothering others and without the disruption of wires or cables. One or more of earbuds 681 and 682 may include other features, such as a microphone for capturing audio information from the user and transmitting back to the electronic device, or to another device. While many of the examples herein are described with respect to having two earbuds or earphones, the techniques disclosed herein are equally applicable to configurations utilizing only a single earbud or earphone and to configurations using more than two earbuds or earphones. The techniques are also equally applicable to configurations using a headset that includes both an earphone and a microphone, such as to a Bluetooth audio headset for use with a cellular phone.

Figure 7A:
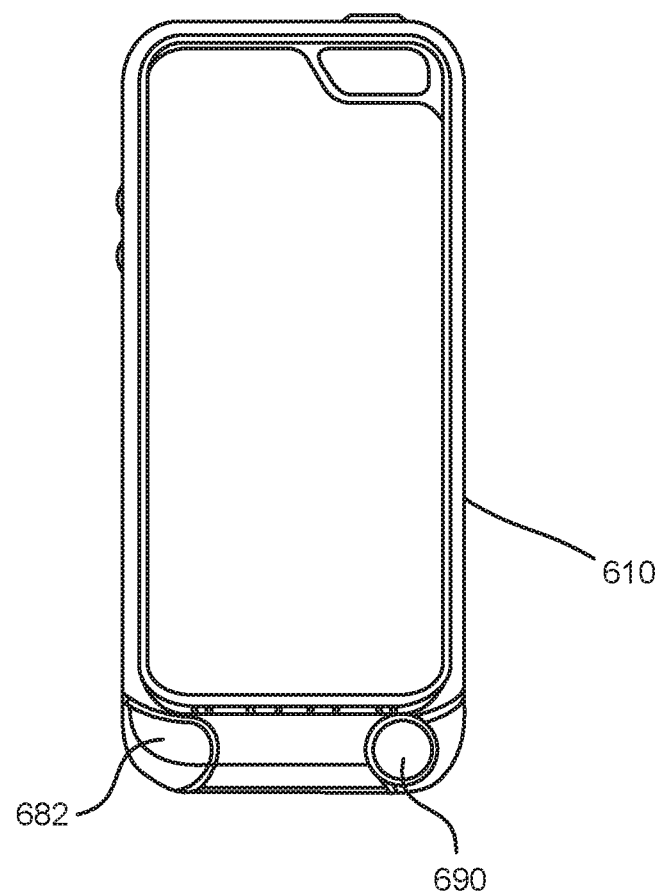
FIG. 7A illustrates the protective case of FIG. 6 with one wireless peripheral device unstowed.
Figure 7B:
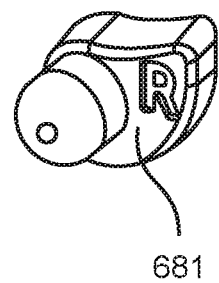
FIG. 7B illustrates a wireless peripheral device.

FIG. 7A illustrates battery case 610 with earbud 681 unstowed. FIG. 7B illustrates earbud 681 removed from battery case 610. In FIG. 7A, battery case 610 is illustrated with earbud 681 removed from a docking location 690 on battery case 610. Docking location 690 is a storage location for earbud 681 that allows earbud 681 to be easily removably stowed in battery case 610. In some configurations, docking location 690 may also be referred to as a docking receptacle. Another docking location similar to docking location 690 may be included for earbud 682. Stowing or docking earbuds 681 and 682 in battery case 610 makes them readily available for use with an electronic device installed in battery case 610 and reduces the chances that they will be forgotten, lost, left behind, or misplaced. Docking location 690 may be present at any location on battery case 610. Battery case 610 may semi-permanently retain earbud 681 using one or more of a variety mechanical mechanisms including: a hook, a tab, a flexible lever, a retention feature, a spring clip, a slot, a fastener, a groove, a rail, a hook and loop fastener, a magnet, an adhesive, an interference fit, and/or any component which keeps earbud 681 removably in place or removably retained in docking location 690.

In some configurations, docking location 690 and battery case 610 may provide physical protection to earbud 681 when inserted docking location 690. Protection may include protection from bumps, dropping, impact, jarring, shock, dirt, dust, mud, mist, rain, water, or snow. In some configurations, earbud 681 may contain one or more portions, such as the portion where sound leaves earbud 681, that are susceptible, or more susceptible, to moisture or water. Docking location 690 may include a cavity and gasket or sealing mechanism that receives and protects at least a susceptible portion of earbud 681 to protect it from moisture or water, even though other portions of earbud 681 may remain exposed to these elements. The protective functions described above with respect to a wireless earbud may also be implemented with respect to other peripherals, including wired peripherals, which are attached to a protective case and/or to an electronic device inside the protective case.

While the storage functions for earbuds 681 and 682 are described herein with respect to a battery case, such as battery case 610, it should be understood that these techniques are also applicable to other types of protective cases which may not necessarily include a battery or power source. However, in the example of a battery case, a power or charging function may also be included. For example, battery case 610 may charge a rechargeable battery of earbud 681 when earbud 681 is docked or stored in docking location 690. Beneficially, charging earbud 681 when it is not in use increases the amount of battery power available in earbud 681 and extends the operational life of earbud 681 available to the user when the earbud is removed from the docking location for use. The charging capability of battery case 610 may be dedicated to charging earbuds 681 and 682, dedicated to charging an electronic device inserted into battery case 610, dedicated to charging another peripheral device, or may be used for charging a combination of these devices, either sequentially or simultaneously.

Charging of earbud 681 and/or 682 by battery case 610 may be performed through a wired and/or through a wireless charging connection. In the example of a wired charging connection, docking location 690 may include electrical contacts (not pictured) that electrically interface to electrical contacts of earbud 681 to provide electrical power from battery case 610 to earbud 681. In the example of a wireless charging connection, battery case 610 may transfer power to earbud 681 using induction, inductive charging, inductive coupling, resonant inductive coupling, magnetic resonant inductive coupling, or a combination thereof. The wireless charging may conform to one or more wireless charging protocols including Qi, Powermat, A4WP, Rezence, other protocols or standards, or combinations thereof. Protective case 610 may also be configured to receive electrical power using one or more of the wireless charging methods described herein and/or using one or more of the wireless charging protocols described herein.

In one variation, the peripheral stowing and/or charging functions discussed with respect to FIGS. 6 and 7 may be implemented in the form of an apparatus that attaches to one or more sides of an electronic device without necessarily encasing or enclosing the electronic device. For example, an earbud holder having features similar to those described herein may attach to the back of a smartphone for docking and storing earbuds. The attachment to the smartphone may be accomplished using an adhesive, a removable adhesive, a hook and loop fastener, a clip, a strap, a snap, a magnet, a slot, a rail, a conforming element, a suction feature, another attachment feature, and/or combinations thereof. Beneficially, an apparatus of this type may be adaptable to many different models and types of electronic devices because it may not be necessary for it to fit the specific mechanical dimensions of the outer envelope of the electronic device.

As described in the examples herein, the protective case, cover, or other apparatus in which the wireless earbuds are stored may contain a battery which can provide electrical power to the earbuds to charge them when they are in the docked or stored position. Alternately, the protective case, cover, or apparatus may not contain a battery but may still include an electrical connection to the electronic device which enables the battery of the electronic device to be used to recharge the earbuds when they are in the docked or stored location, via the case, cover, or apparatus. In other words, the protective case, cover, or apparatus may not necessarily be the source of the charging power to the earbuds but may facilitate transfer of power from the electronic device to the earbuds.

Each of the electrical connections described above (the electrical connection between the electronic device and the protective case and the electrical connection between the protective case and each of the one or more docked earbuds) may be a wired or wireless electrical connection. Power may be transferred through one or more wireless connections using induction, inductive charging, inductive coupling, resonant inductive coupling, magnetic resonant inductive coupling, or a combination thereof. In addition to transferring electrical or charging power, any of the electrical connections discussed herein may also be used for transferring data or control signals between the various devices.

Using the techniques described herein, a protective case, cover, enclosure, or encasement of the types described herein may be used to store, dock, exchange data with, and/or charge any other type of electrical or electronic peripheral device or devices. The peripheral device(s) may be used with the protective case and/or with used with an electronic device installed in the protective case.

In one example, a wireless biological sensor or biometric sensor, such as a wireless heart rate monitor, has a stowage location in one of the protective cases, covers, or encasements described herein. When a user wishes to use the biological sensor in conjunction with an activity, it is removed from the docking or stowage location and placed on the body, or in another preferential location for gathering the desired biological data. While in use, the biological sensor gathers data and transmits that data to the electronic device that is in the protective case. When the biological sensor is in the stowage location on the protective case, a rechargeable battery or other replenishable power source of the biological sensor may be charged by the protective case and/or the electronic device, either through electrical contacts or wirelessly.

In another example, a wireless peripheral device may include a sensor other than a biological sensor. The peripheral device may include a sensor for gathering data from a piece of exercise equipment or work equipment, such as a sensor for measuring the speed or pedal cadence of a bicycle. The sensor is removed from the protective case and placed in a preferred position to gather data, which may be transmitted to the electronic device wirelessly using a protocol such as Bluetooth or Bluetooth Low Energy. The sensor is then returned to the protective case after use and can be charged by the protective case to prepare it for another future use.

In yet another variation of the examples above, a peripheral device for use with the protective cases, covers, or encasements described herein may use a stowed position in the case for communicating data in addition to the charging functions described above. For example, the peripheral device may include a temperature sensor or other industrial sensor. The peripheral device is removed from the protective case and placed at, or near, a preferred location to gather data. In this implementation, the peripheral does not necessarily transmit data when separated from the protective case. When returned to the protective case, the peripheral may transmit the collected data to the protective case and/or the electronic device in addition to being recharged by the protective case. The transmission of the data may take place wirelessly or may utilize a wired connection such as electrical contacts on the protective case that engage the peripheral when the peripheral is placed in the stowage position on the case. Data communication between the protective case and the peripheral device may be unidirectional or bidirectional.

Figure 8:
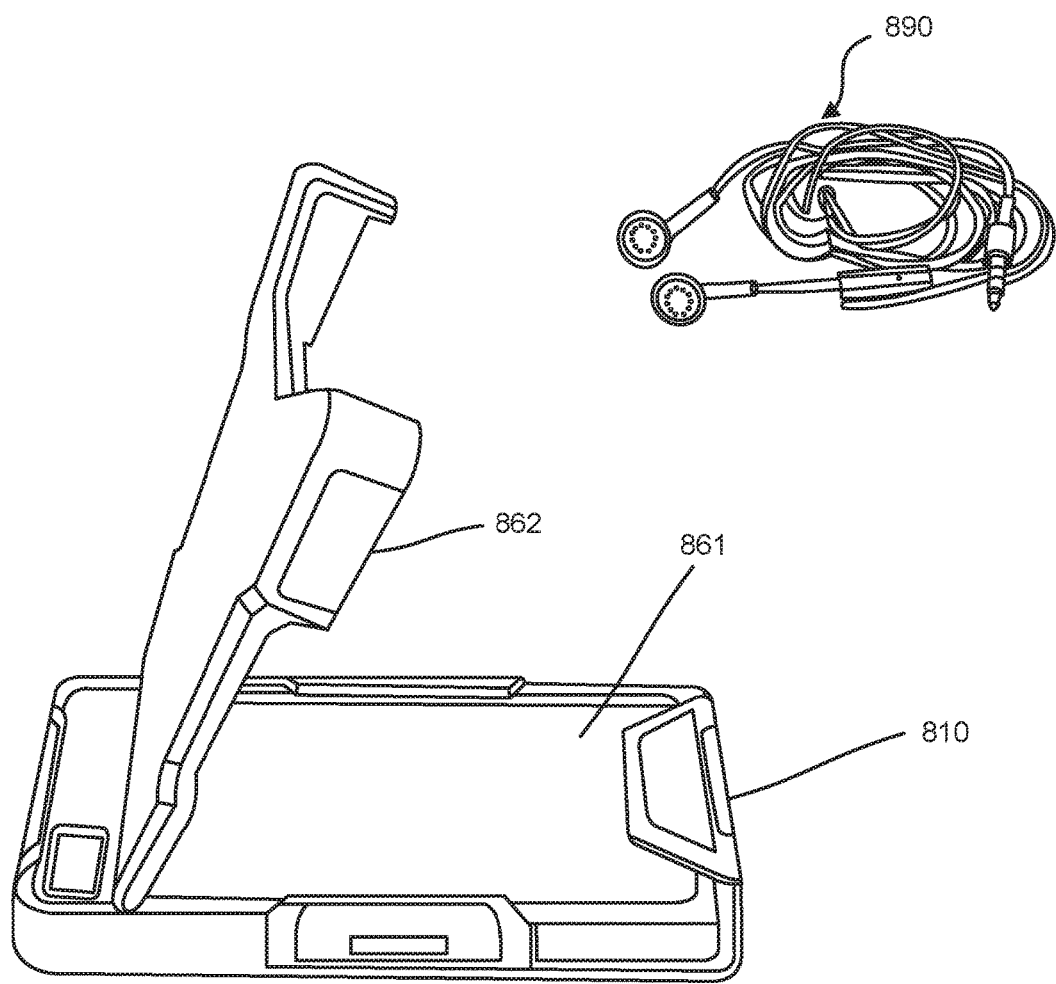
FIG. 8 illustrates a protective case having a compartment for a peripheral device.

FIG. 8 illustrates a protective encasement 810 for an electronic device. Protective encasement 810 is an example of protective case 110. In the view illustrated in FIG. 8, a back of protective encasement 810 is visible and includes a compartment 861 for storing a peripheral device, such as headphones 890. An electronic device used with protective encasement 810 would be visible and/or inserted into protective encasement 810 from the opposite side of protective encasement 810. Protective encasement 810 includes a door 862 for enclosing or covering compartment 861. In some configurations, compartment 861 may include a gasket or other sealing mechanism for making compartment 861 water resistant and/or waterproof.

Figure 9:
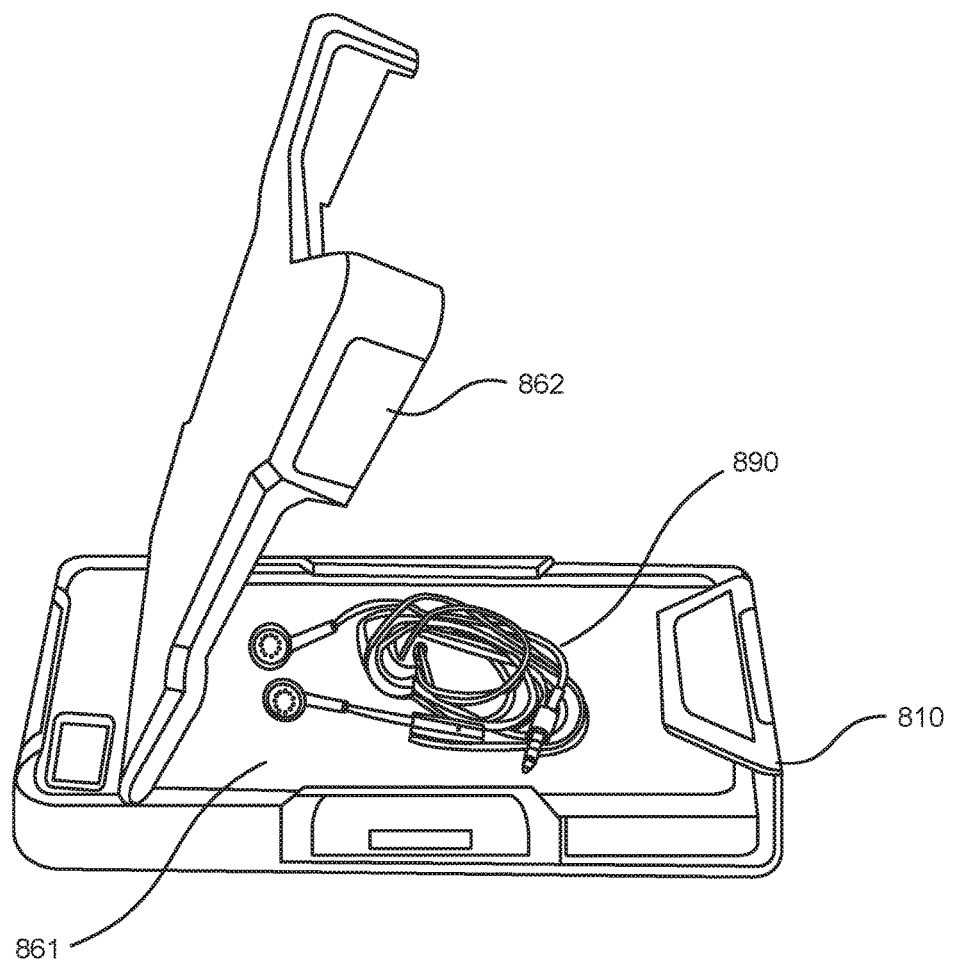
FIG. 9 illustrates the protective case of FIG. 8 with a peripheral device stored in the compartment.

Compartment 861 may be used for storing one or more peripherals, such as headphones 890, and/or for storing other objects or devices, such as keys, a credit card, and/or money. Beneficially, headphones 890 and/or the other objects are carried with protective encasement 810 and the associated electrical device such that they are readily available, not easily lost, protected from damage, and/or protected from tangling. FIG. 9 illustrates headphones 890 stored in compartment 861 of protective encasement 810.

While protective encasement 810 is illustrated as having the storage compartment 861 on the back of protective encasement 810, compartment 861 could be included on any part of protective encasement 810 and/or accessible from any side of protective encasement 810. Similarly, even though door 862 is illustrated as being hinged to and pivoting from protective encasement 810, many other configurations are possible. For example, door 862 may completely separate from protective encasement 810 when opened and/or may slide open from protective encasement 810.

Figure 10:
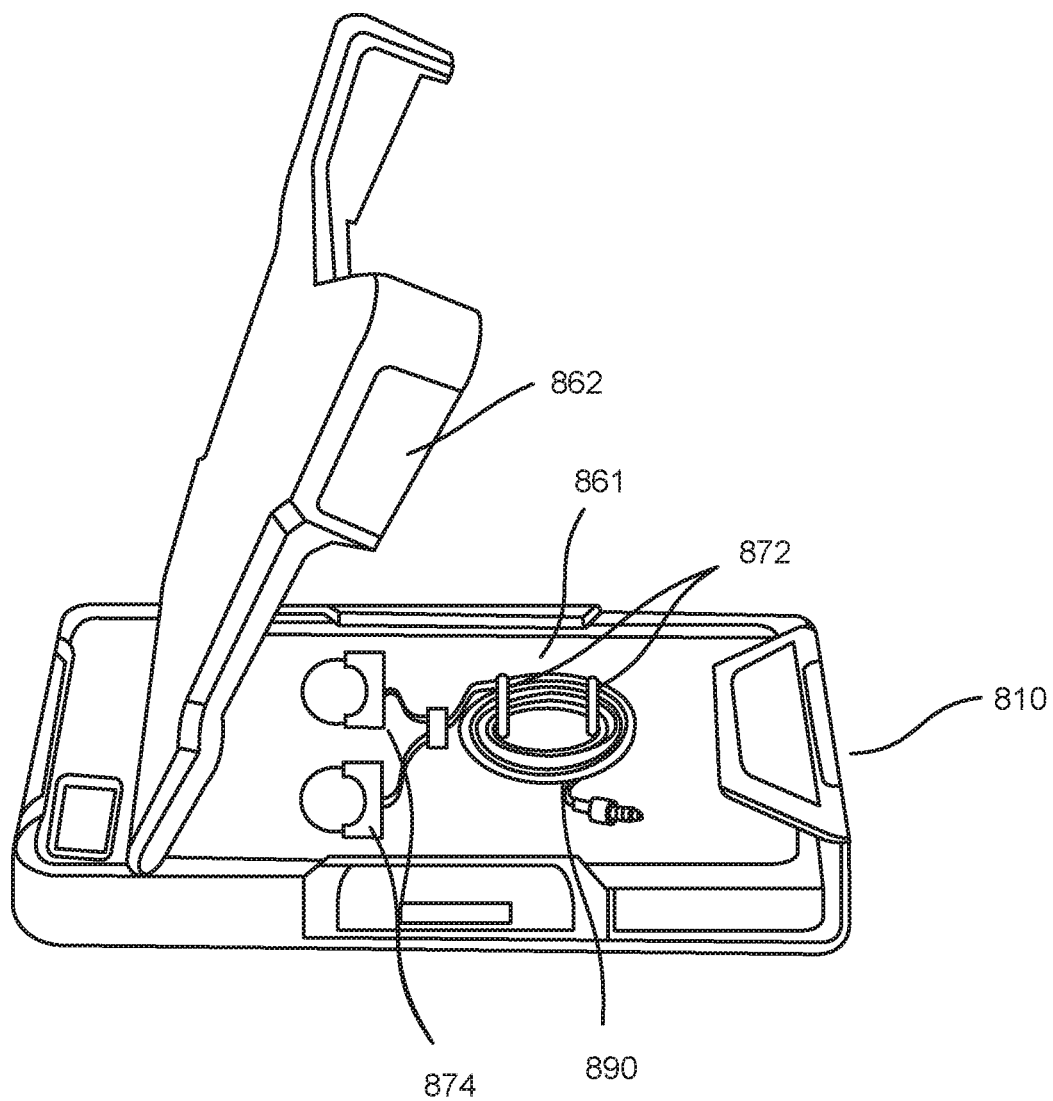
FIG. 10 illustrates an alternate configuration of the protective case of FIGS. 8 and 9.

FIG. 10 illustrates a variation of protective encasement 810 in which storage compartment 861 further includes specific features for facilitating storage of headphones 890. Specifically, compartment 861 includes holders 874 for holding or retaining the speaker portions of headphones 890 and posts 872 for wrapping the cable of headphones 890 around. Many other components are possible inside compartment 861 for managing storage of headphones 890 and/or any other peripheral or object that is stored in the compartment. These features enable the headphones, other peripheral device(s), or objects to be stored in a more secure manner and/or a more organized manner and reduce the possibility of cables getting tangled or knotted.

Many other types of features for managing the storage of a peripheral device and/or associated cables inside compartment 861 are possible. For example, compartment 861 of protective encasement 810 may also be configured to permit connection of a peripheral device to an electronic device through an opening, hole, port, passage, channel, or other path in protective encasement 810. In other words, the peripheral device may be connected to the electronic device within protective encasement 810 and without the peripheral cable needing to extend outside or on an outside surface of protective encasement 810. This may be accomplished by feeding the peripheral cable through an internal passage and connecting it directly to the electronic device.

Alternately, a cavity of protective encasement 810 may include an electrical connector or port to which a peripheral device can be attached. The electrical port or connector of protective encasement 810 may then be internally connected, directly or indirectly, to the electronic device using one or more of the techniques described herein where there is not an opening or aperture between compartment 861 and an area of protective encasement 810 containing the electronic device. A connection between the peripheral device and the electronic device while maintaining isolation between the associated compartments of the protective case may be accomplished using one or more techniques including: radio frequency communication, optical communication, infrared communication, near field communication, inductive coupling, a water resistant electrical feed-through device, and/or a waterproof electrical feed-through device.

Figure 11:
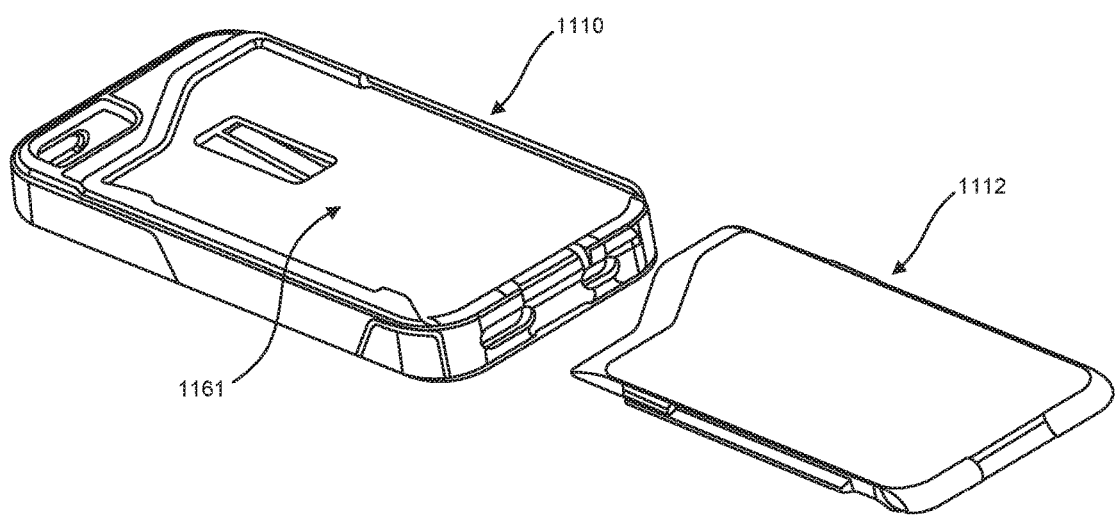
FIG. 11 illustrates a protective case for a mobile computing device.

FIG. 11 illustrates a protective cover 1110 for a mobile computing device. Protective cover 1110 includes an alternate type of cavity 1161 for storing a peripheral device. The view illustrated in FIG. 11 is of a back side of protective cover 1110. A mobile computing device used with protective cover 1110 would typically be inserted and/or visible in the front, or opposite, side of protective cover 1110. Cover 1112 slides on and off of protective cover 1110 to expose or cover storage compartment 1161 which may be used to store a peripheral device in protective cover 1110. It should be understood that many other case, compartment, and cover configurations are possible. Compartment 1161 may contain any of the features of compartment 861 described above.

In some embodiments, the protective cases, covers, enclosures, or encasements described herein may also include additional features for assisting in the operation of or enhancing the operation of a peripheral device. In one example, a protective case for use with an audio peripheral, such as speakers, headphones, and/or a microphone, includes electrical circuitry for improving the performance of the audio peripheral. The circuitry may include an amplifier, an equalizer, a filter, audio enhancement features, noise reduction components, and/or noise canceling components. The circuitry may include analog electrical components, digital electrical components, discrete components, integrated circuits, a computer processor, a microcontroller, a digital signal processor, and/or other electrical components including combinations thereof.

In one specific example, a protective case may include a supplemental or high quality audio amplifier for providing improved and/or increased amplification for audio signals sent to a set of headphones used with the protective case and/or used with an electronic device that is inside the protective case. The electronic device provides audio playback information to the protective case, either through electrical contacts or wirelessly. The high quality amplifier in the protective case amplifies these signals using higher quality components and/or methods may have been used had the amplification been provided by the electronic device itself. The high quality amplified signals are then output from the protective case to a set of headphones for an improved audio experience.

In another example, the protective case may include a retractable corded biological sensor, such as a heart rate monitor. The protective case may include electrical and/or electronic circuitry for driving, controlling, reading, and/or powering the biological sensor. The protective case may also include electrical and/or electronic circuitry for processing, conditioning, digitizing, and/or amplifying signals received from the biological sensor. In some situations, the signals from a biological sensor, such as a heart rate monitor, may be relatively weak and the circuitry may amplify and/or digitize these signals before providing the signals to the electronic device.

Figure 12:
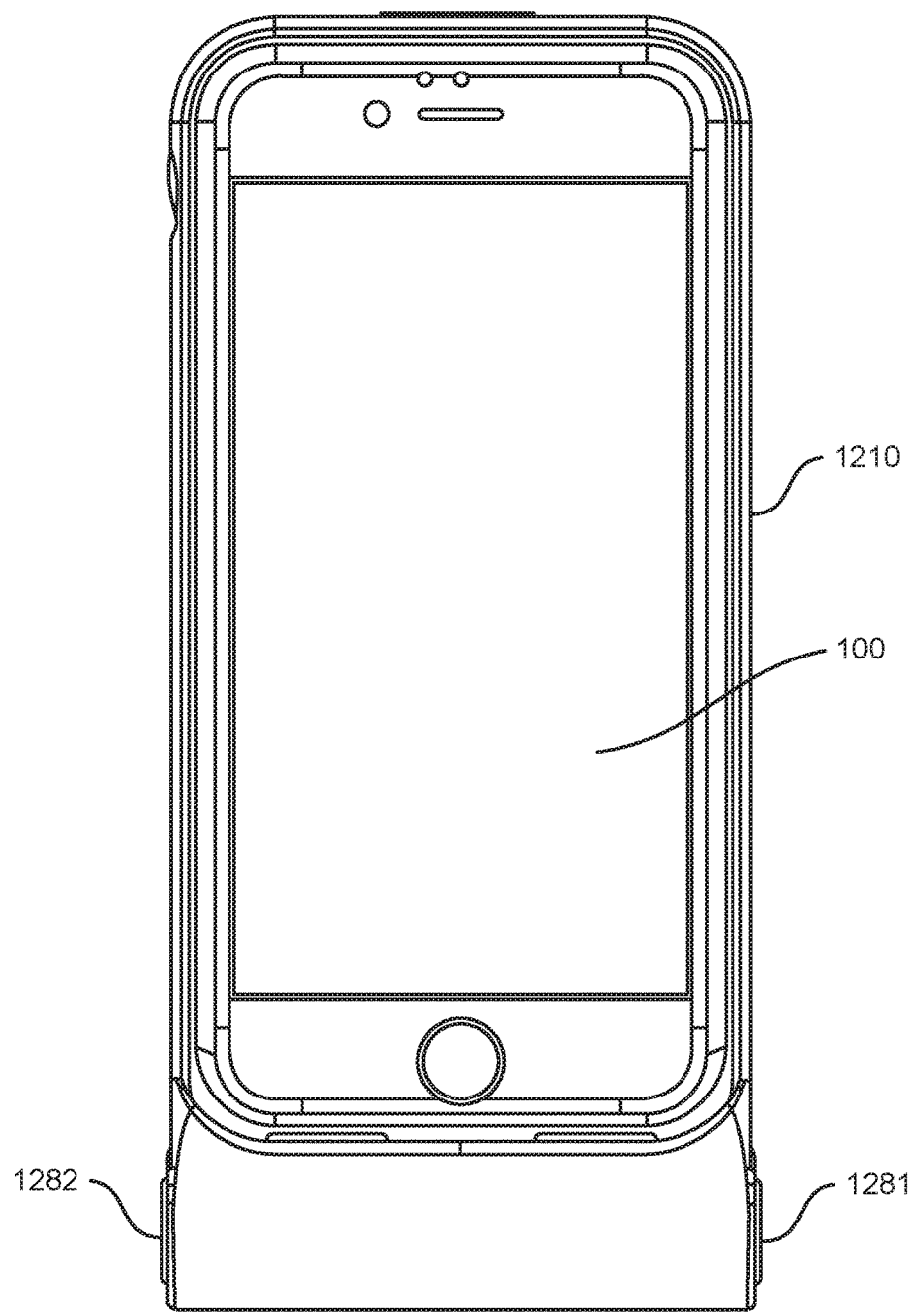
FIG. 12 illustrates a front view of a protective case having docking locations for earbuds.

FIG. 12 illustrates a front view of a protective case 1210 having docking locations for earbuds 1281 and 1282. Protective case 1210 is illustrated with electronic device 100 installed. Protective case 1210 is an example of protective case 610 and may or may not include a supplemental battery. Earbuds 1281 and 1282 are each examples of earbud 681 and/or earbud 682. Earbuds 1281 and 1282 are stored in docking locations, stowage locations, and/or docking receptacles that are accessible from sides of protective case 1210. Docking locations, stowage locations, and/or docking receptacles may be placed in other locations on protective case 1210. Earbuds 1281 and 1282 are removably retained or held in protective case 1210 until a user wishes to use them and removes them from protective case 1210 for use. Earbuds 1281 and 1282 may be wired or wireless and may be electrically charged by protective case 1210 and/or electronic device 100 when they are stowed. In some examples, only a single earbud, headset, Bluetooth headset, sensor, or other peripheral may be used with protective case 1210.

Protective case 1210 may comprise a single component or it may comprise multiple components which fit, snap, or clasp together. In some configurations, a component of protective case 1210 may comprise multiple materials and/or multiple layers. In one example, protective case 1210 may comprise an outer layer as well as a soft inner layer that is in contact with installed electronic device 100. In some configurations, the outer layer may be a rigid outer layer, a structural member or layer, and/or a resilient layer that protects against impacts, bending, punctures, scratching, and/or other forces or elements. In some configurations, the soft inner layer may cushion electronic device 100, reduce transfer of forces from outside protective case 1210 to electronic device 100, and protect electronic device 100 from scratching, wear, marring, and/or other forces. In some configurations, protective case 1210 may also have a membrane or film that protects an interactive touchscreen of electronic device 100 while still allowing the interactive touchscreen to be operated by a user through the membrane or film.

Figure 13:
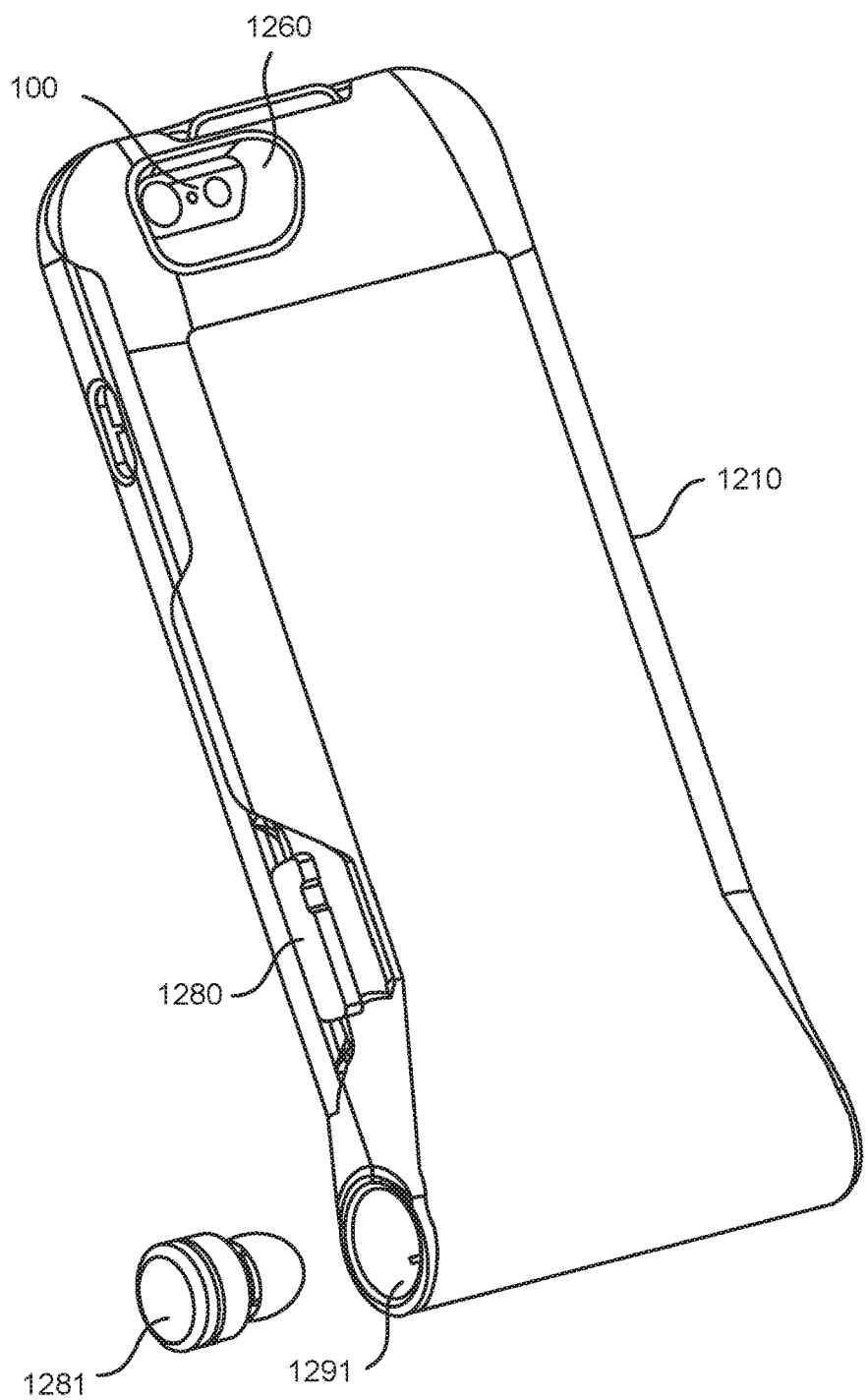
FIG. 13 illustrates a back perspective view of the protective case of FIG. 12 with an undocked earbud.

FIG. 13 illustrates a back perspective view of protective case 1210 with earbud 1281 removed from docking receptacle 1291. A small portion of electronic device 100 is visible through a camera opening 1260 of protective case 1210. Docking receptacle 1291 may sometimes also be described as a docking location, a stowage location, a receiving area, and/or a receiver for an earbud or other electrical or electronic peripheral device.

Docking receptacle 1291 may include a wired or wireless electrical interface for communicating electrical power and/or data between earbud 1281 and electronic device 100 and/or between earbud 1281 and protective case 1210. Protective case 1210 also includes a port cover 1280 which covers an external electrical interface to protective cover 1210. The electrical interface may be used for providing electrical power and/or data communications to protective case 1210 and/or to electronic device 100 from an external source or device. Protective case 1210 may also include an electrical interface for electrically connecting to electronic device 100.

Electrical power received by protective case 1210 may be distributed among any combination of: protective case 1210, electronic device 100, and/or one or more docked peripheral devices, such as earbud 1281. When protective case 1210 is not receiving external electrical power from an external power source, electrical power may be supplied to one or more docked peripheral devices by protective case 1210, by electronic device 100, or by a combination thereof. Protective case 1210 may include a battery and may supply electrical power to one or more of electronic device 100 and/or one or more docked peripheral devices. Protective case 1210 may include electrical circuitry, electrical components, analog components, digital components, discrete components, a circuit board, electrical connectors, and/or a computer processor or microprocessor for performing any of the power management functions described herein, as well as for performing data communications, if any.

Figure 14:
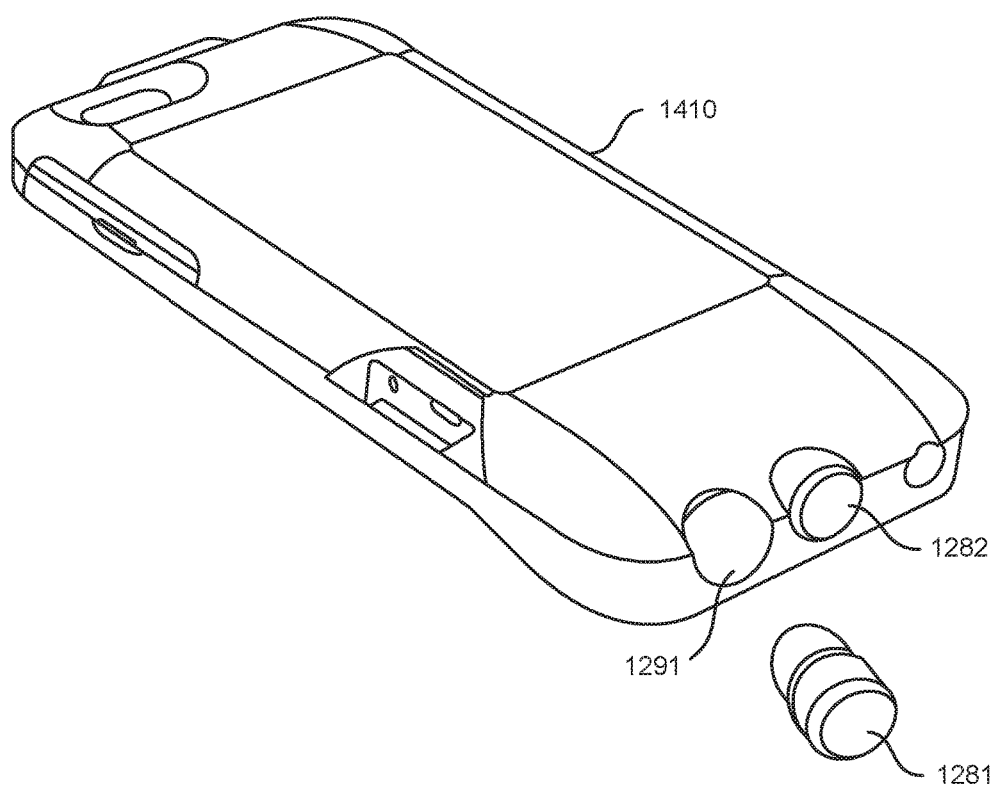
FIG. 14 illustrates a perspective view of a protective case having docking locations for earbuds.
Figure 15:
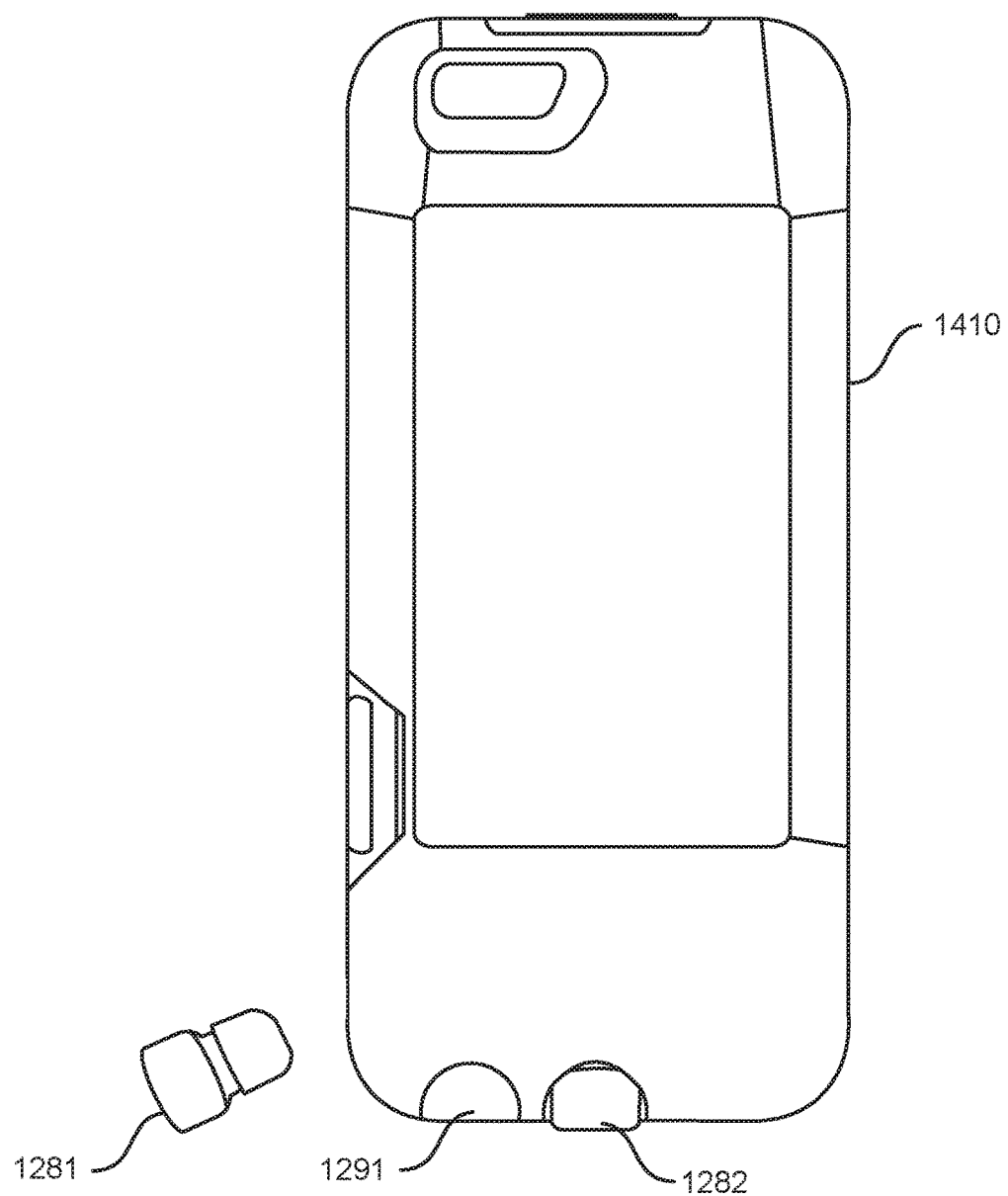
FIG. 15 illustrates a back view of the protective case of FIG. 14.

FIG. 14 illustrates a back perspective view of a protective case 1410. Protective case 1410 is an example of and may include features of any of the other protective cases disclosed herein and includes docking receptacles for earbuds 1281 and 1282 on a surface or bottom area of protective case 1410. As with the other examples of protective cases provided herein, protective case 1410 may or may not include a battery and may or may not be capable of charging earbuds 1281 and 1282. In some configurations, the docking receptacles, such as docking receptacle 1291, may be spring loaded such that pushing one of earbuds 1281 and 1282 into the docking receptacle a first distance causes it to be removably retained while pushing it again to another depth causes it to be released. A docking receptacle may be located at any place on protective case 1410. FIG. 15 illustrates a back view of protective case 1410 of FIG. 14.

Figure 16:
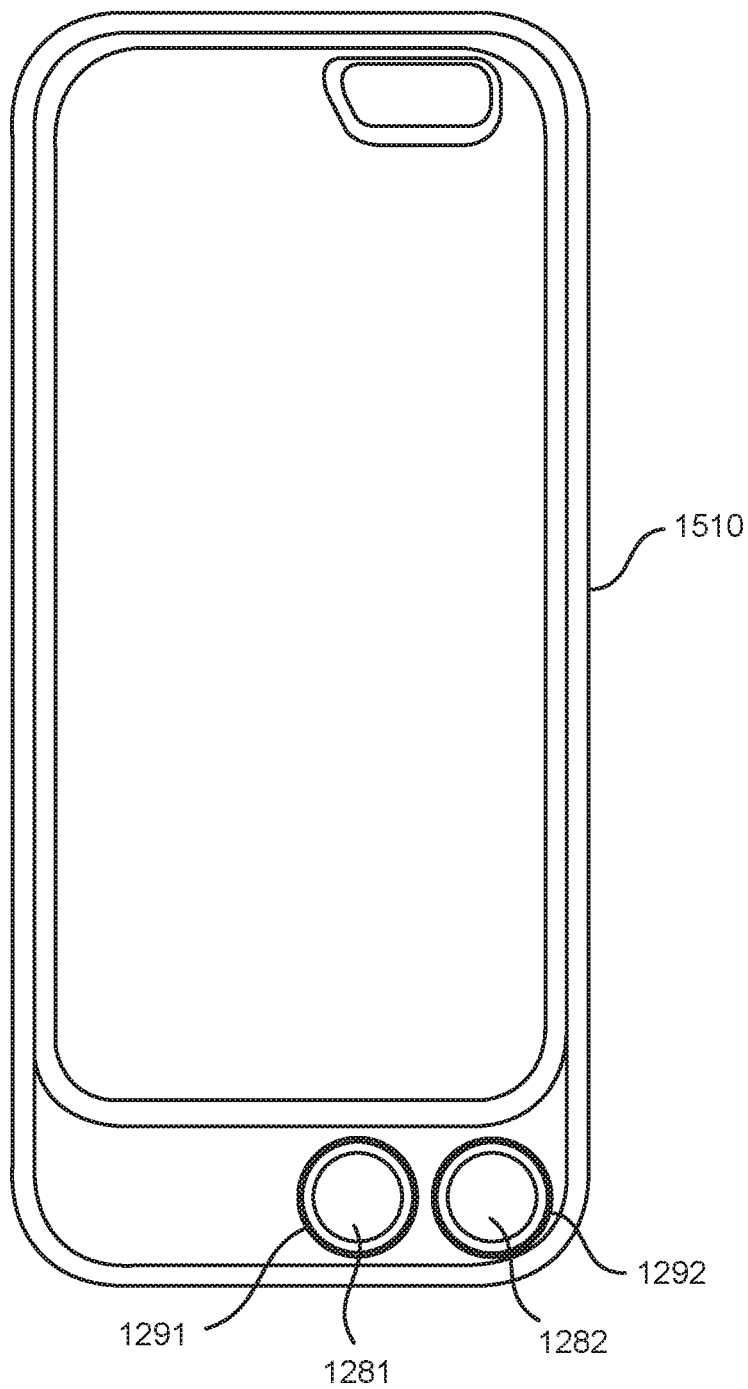
FIG. 16 illustrates a front view of a protective case having docking locations for earbuds.

FIG. 16 illustrates a front view of a protective case 1510. Protective case 1510 is an example of and may include features of any of the other protective cases disclosed herein. Protective case 1510 includes docking receptacles 1291 and 1292 on a front surface of protective case 1510. Docking receptacles 1291 and 1292 removably retain earbuds 1281 and 1282, respectively. As with the other examples of protective cases herein, protective case 1510 may or may not include a battery and may or may not be capable of charging earbuds 1281 and 1282. Each of docking receptacles 1291 and 1292 may include a snap, a tab, a clip, a magnet, a flexible element, a spring, a twist lock feature, a threaded portion, a friction fit, an interference fit, a piece of compliant material, or another component which provides some kind of friction, stiction, adhesion, and/or retention function to removably retain earbuds 1281 and 1282, respectively. The retention force is sufficient to keep earbuds 1281 and 1282 from accidentally being dislodged from protective case 1510 while still allowing a user to eject earbud 1281 and/or 1282 from protective case 1510 for use when desired.

Figure 17:
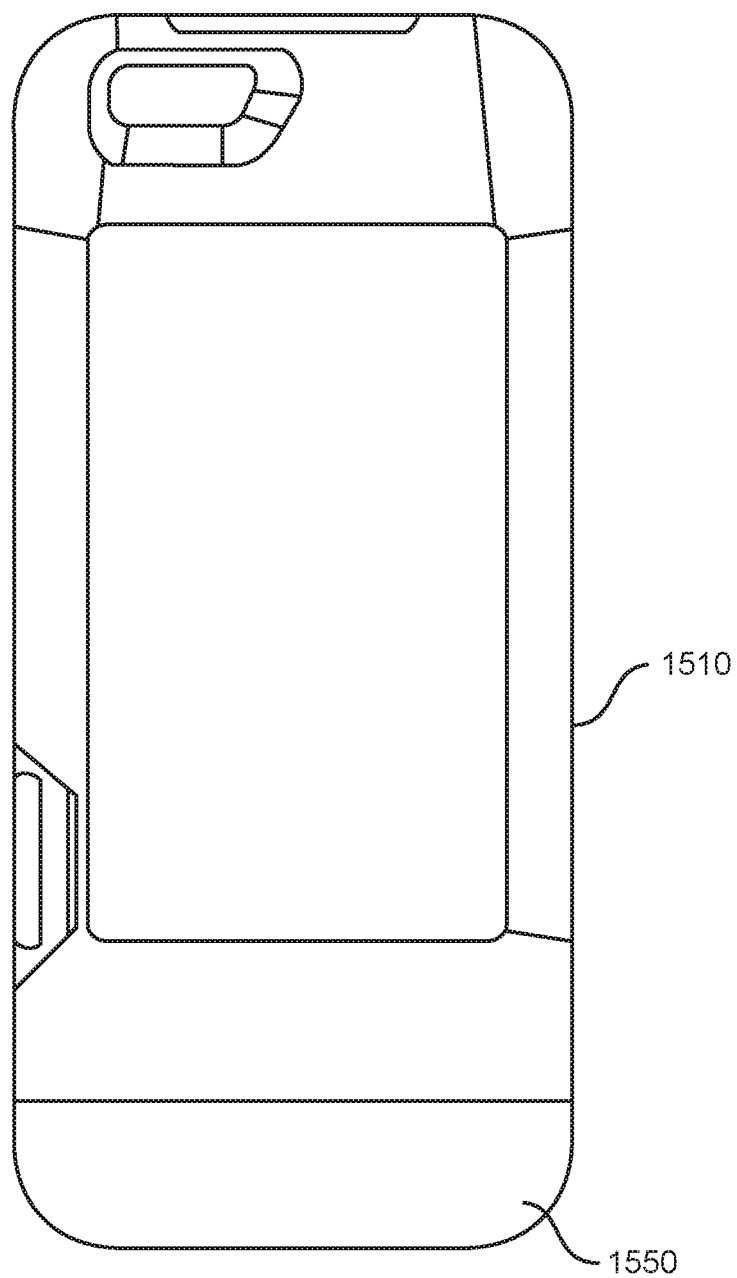
FIG. 17 illustrates a back view of the protective case of FIG. 16.

FIG. 17 illustrates a back view of protective case 1510 which includes flexible member 1550. Flexible member 1550 is positioned in proximity to and opposite docked earbuds 1281 and 1282 such that it can be used to push or release earbud 1281 and/or 1282 from the associated docking receptacles 1291 and 1292. Flexible member 1550 includes a panel, section, or insert that is configured to temporarily deform toward a cavity of docking receptacles 1291 and 1292 from inside protective case 1510 in response to an external force applied to the flexible member 1550, such as from a user pushing on flexible member 1550 from a back of protective case 1510. Temporary deformation or collapsing of flexible member 1550 due to the force from the user results in flexible member 1550 contacting earbud 1281 and/or 1282 at an inside area of protective case 1510 and/or in the cavity of docking receptacles 1291 and/or 1292 to push or eject one or both of earbuds 1281 and 1282 from their respective docking receptacle. In other words, flexible member 1550, at the back of protective case 1510, is pressed to overcome the retention force or mechanism of docking receptacles 1291 and 1292 to remove the earbuds 1281 and 1282, respectively, for use. Beneficially, protective case 1510 keeps earbuds 1281 and 1282 conveniently stowed when not in use and a user can easily and intuitively eject the earbuds 1281 and 1282 from protective case 1510 for use when desired. Protective case 1510 may or may not be configured to charge earbuds 1281 and 1282 when they are docked or stowed.

Flexible member 1550 may naturally relax to its original shape when the force is removed or may only be pushed back to its original shape when earbuds 1281 and 1282 are re-inserted into docking receptacles 1291 and 1292 of protective case 1510. Flexible member 1550 may comprise silicone or a similar flexible material. Flexible member 1550 and docking receptacles 1291 and 1292 may reside at other locations on protective case 1510. In one example, a separate flexible member may be associated with each of docking receptacles 1291 and 1292. In another example, one or more flexible members for ejecting a peripheral may contain a bellows structure, an accordion shape, or another structure with folds that allow the flexible member to be pushed to eject the peripheral and also returns to its default position. Flexible member 1550 may make direct contact with earbuds 1281 and 1282 or may contact them indirectly through another component.

In one variation of the example of FIG. 16, flexible member 1550 may not be present and docking receptacles 1291 and 1292 may be open, at least partially, to the back of protective case 1510 such that a user can directly press earbuds 1281 and 1282 from the back of protective case 1510 to push or eject them from docking receptacles 1291 and 1292 from the front of protective case 1510. In yet another variation, protective case 1510 may contain one or more spring loaded plungers or posts for pushing, ejecting, or releasing earbuds 1281 and 1282 from protective case 1510.

The components and configurations described herein are meant to exemplify some types of possibilities. In no way should the examples provided herein limit the scope of the invention as they are only exemplary embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in other examples," "in some cases," "in some situations," "in some configurations", "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

What is claimed is:

1. A protective case for an electronic device and an associated wireless electrical peripheral device, the protective case comprising:
   a structural member configured to receive at least a portion of the electronic device and protecting the electronic device when the electronic device is installed in the protective case;
   an aperture configured to provide access to a user interface of the installed electronic device;
   a docking receptacle configured to removably retain the wireless electrical peripheral device, wherein the docking receptacle includes a cavity for receiving at least a portion of the wireless electrical peripheral device and an engagement mechanism for removably retaining the wireless electrical peripheral device in the cavity; and
   a flexible member attached to the structural member and positioned in proximity to the docking receptacle, wherein the flexible member is configured to temporarily deform toward the cavity of the docking receptacle in response to an external force applied to the flexible member, the deformation of the flexible member resulting in the flexible member contacting the retained wireless electrical peripheral device to eject the wireless electrical peripheral device from the docking receptacle.

2. The protective case of claim 1, wherein the wherein the flexible member is configured to contact the retained wireless electrical peripheral device in the cavity of the docking receptacle to eject the wireless electrical peripheral device from the docking receptacle in response to the external force applied to the flexible member.

3. The protective case of claim 1, wherein the docking receptacle is positioned on a first surface of the protective case and the flexible member is positioned on a second surface of the protective case.

4. The protective case of claim 3, wherein the first surface is opposite the second surface.

5. The protective case of claim 3, wherein the first surface is a front surface of the protective case and the second surface is a back surface of the protective case.

6. The protective case of claim 1 wherein the structural member includes a top edge, a first side edge, a second side edge opposite the first side edge, and a bottom edge, and wherein the docking receptacle is positioned proximate the bottom edge of the structural member.

7. A protective case for use with a portable electronic device and a first wireless earbud for wirelessly exchanging data with the portable electronic device, the protective case comprising:
- a structural member configured to receive at least a portion of the electronic device and protecting the electronic device when the electronic device is installed in the protective case;
- an aperture configured to provide access to a user interface of the installed electronic device;
- a first receptacle including a first engagement mechanism for removably retaining the first wireless earbud and a first cavity for receiving at least a portion of the first wireless earbud when the first wireless earbud is retained in the first receptacle; and
- a first flexible member attached to the structural member and positioned in proximity to the first receptacle, wherein the first flexible member includes a first section configured to deform toward the first cavity in response to an external force applied to the first flexible member, the deformation of the first section resulting in the first flexible member ejecting the first wireless earbud from the first cavity.

8. The protective case of claim 7, further comprising a second receptacle including a second engagement mechanism for removably retaining a second wireless earbud configured for wirelessly exchanging data with the portable electronic device, and a second cavity for receiving at least a portion of the second wireless earbud when the second wireless earbud is retained in the second receptacle; wherein the first section is configured to deform toward the first cavity and the second cavity in response to the external force applied to the first flexible member, the deformation of the first section resulting in the first flexible member ejecting the first wireless earbud from the first cavity and the second wireless earbud from the second cavity.

9. The protective case of claim 7, further comprising:
- a second receptacle including a second engagement mechanism for removably retaining a second wireless earbud configured for wirelessly exchanging data with the portable electronic device, and a second cavity for receiving at least a portion of the second wireless earbud when the second wireless earbud is retained in the first receptacle; and
- a second flexible member attached to the structural member and positioned in proximity to the second receptacle, wherein the second flexible member includes a second section configured to deform toward the second cavity in response to an external force applied to the second flexible member, the deformation of the second section resulting in the second flexible member ejecting the second wireless earbud from the second cavity.

10. The protective case of claim 7, wherein the first engagement mechanism comprises a snap, a tab, a clip, a magnet, a flexible element, a spring, a twist lock feature, a threaded portion, a friction fit, an interference fit, or a piece of compliant material.

11. The protective case of claim 7, wherein the first section of the first flexible member is configured to temporarily deform toward the first cavity in response to the external force applied to the first flexible member and to relax to its original shape when the external force is removed.

12. The protective case of claim 7, wherein the first section of the first flexible member is configured to temporarily deform toward the first cavity in response to the external force applied to the first flexible member and to return to its original shape when the first wireless earbud is received in the first cavity.

13. The protective case of claim 7, wherein the first flexible member is configured to eject the first wireless earbud from the first cavity by directly contacting the first wireless earbud.

14. The protective case of claim 7, wherein the first flexible member is configured to eject the first wireless earbud from the first cavity by indirectly contacting the first wireless earbud through an intermediate component.

15. A protective case for an electronic device and an associated wireless electrical peripheral device, the protective case comprising:
- a structural member for receiving at least a portion of the electronic device and protecting the electronic device when the electronic device is installed in the protective case;
- an aperture that provides access to a user interface of the installed electronic device;
- a docking receptacle for removably retaining the wireless electrical peripheral device, wherein the docking receptacle includes a cavity for receiving at least a portion of the wireless electrical peripheral device and an engagement mechanism for removably retaining the wireless electrical peripheral device in the cavity; and
- a flexible member attached to the structural member and positioned in proximity to the docking receptacle, the flexible member including one or more folds adapted to allow the flexible member to temporarily deform toward the cavity of the docking receptacle in response to an external force applied to the flexible member, the deformation of the flexible member resulting in the flexible member ejecting the retained wireless electrical peripheral device from the cavity, the one or more folds adapted to return the flexible member to its default position.

16. The protective case of claim 15, wherein the flexible member contains a bellows structure or an accordion shape adapted to allow the flexible member to temporarily deform toward the cavity of the docking receptacle and to return the flexible member to its default position.

17. The protective case of claim 15, wherein the docking receptacle is positioned on a first surface of the protective case and the flexible member is positioned on a second surface of the protective case opposite the first surface.

18. The protective case of claim 15, wherein the protective case is adapted to electrically charge the retained wireless electrical peripheral device.

19. The protective case of claim 15, further comprising a battery for charging the retained wireless electrical peripheral device.

20. The protective case of claim 15, further comprising the wireless electrical peripheral device.

* * * * *